*US010797799B2*

(12) United States Patent
Nakagawa et al.

(10) Patent No.: US 10,797,799 B2
(45) Date of Patent: Oct. 6, 2020

(54) OPTICAL TRANSMISSION APPARATUS, OPTICAL TRANSMISSION SYSTEM, AND OPTICAL TRANSMISSION METHOD

(71) Applicant: FUJITSU LIMITED, Kawasaki-shi, Kanagawa (JP)

(72) Inventors: Goji Nakagawa, Sagamihara (JP); Kyosuke Sone, Kawasaki (JP); Yoshio Hirose, Hachioji (JP); Takeshi Hoshida, Kawasaki (JP); Setsuo Yoshida, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/171,250

(22) Filed: Oct. 25, 2018

(65) Prior Publication Data

US 2019/0165865 A1 May 30, 2019

(30) Foreign Application Priority Data

Nov. 27, 2017 (JP) ................................. 2017-226823

(51) Int. Cl.
*H04J 14/00* (2006.01)
*H04B 10/572* (2013.01)
(Continued)

(52) U.S. Cl.
CPC ........... *H04B 10/572* (2013.01); *H04B 10/27* (2013.01); *H04J 14/02* (2013.01); *H04J 14/0241* (2013.01);
(Continued)

(58) Field of Classification Search
CPC ....... H04B 10/572; H04B 10/27; H04J 14/02; H04J 14/0276; H04J 14/0241; H04J 14/00; H04J 14/0227; H04Q 11/00
(Continued)

(56) References Cited

U.S. PATENT DOCUMENTS 5,144,467 A * 9/1992 Kitajima ................ H04B 10/60
398/203
9,174,191 B2 * 11/2015 Cavaliere ................ H04J 14/00
(Continued)

FOREIGN PATENT DOCUMENTS

| JP | 2004-056237 | 2/2004 |
|---|---|---|
| JP | 2011-109293 | 6/2011 |
| WO | 2017-104075 | 6/2017 |

*Primary Examiner* — Dibson J Sanchez
(74) *Attorney, Agent, or Firm* — Fujitsu Patent Center

(57) ABSTRACT

An optical transmission apparatus includes a wavelength variable filter whose transmission light wavelength is variable; a receiver that receives light, the light being sent from another optical transmission apparatus and passing through the wavelength variable filter; a transmitter that sends to the another optical transmission apparatus, a utilization permission request for a second wavelength corresponding to a first wavelength of the light received by the receiver, the transmitter sending the utilization permission request as light of the second wavelength and in a form of a tone signal of a predetermined frequency; and a controller that, when receiving from the another optical transmission apparatus, a utilization permission notification of the second wavelength for a sender of the utilization permission request, configures a wavelength of a main signal to the second wavelength, the main signal being sent from the transmitter to the another optical transmission apparatus.

5 Claims, 16 Drawing Sheets

(51) Int. Cl.
*H04B 10/27* (2013.01)
*H04J 14/02* (2006.01)
*H04Q 11/00* (2006.01)

(52) U.S. Cl.
CPC ........... *H04J 14/0276* (2013.01); *H04J 14/00* (2013.01); *H04J 14/0227* (2013.01); *H04Q 11/00* (2013.01)

(58) Field of Classification Search
USPC .................................................. 398/43–103
See application file for complete search history.

(56) References Cited

U.S. PATENT DOCUMENTS

| | | | | |
|---|---|---|---|---|
| 9,647,791 B2* | 5/2017 | Gao | | H04J 14/0246 |
| 9,660,754 B2* | 5/2017 | Dahlfort | | H04J 14/0226 |
| 9,917,671 B2* | 3/2018 | Stracca | | H04J 14/0246 |
| 2006/0239687 A1* | 10/2006 | Gopinath | | H04B 10/503 398/115 |
| 2006/0256811 A1* | 11/2006 | Saito | | H04Q 11/0067 370/465 |
| 2007/0092256 A1* | 4/2007 | Nozue | | H04J 14/0282 398/72 |
| 2008/0085118 A1* | 4/2008 | Effenberger | | H04J 14/0282 398/82 |
| 2008/0089699 A1* | 4/2008 | Li | | H04B 10/07957 398/197 |
| 2008/0267627 A1* | 10/2008 | Effenberger | | H04J 14/02 398/72 |
| 2009/0016726 A1* | 1/2009 | Suzuki | | H04B 10/0793 398/79 |
| 2009/0067838 A1* | 3/2009 | Chen | | H04N 7/22 398/58 |
| 2011/0091213 A1* | 4/2011 | Kawaza | | H04J 14/0282 398/68 |
| 2011/0116798 A1 | 5/2011 | Kai | | |
| 2011/0236017 A1* | 9/2011 | Ohlen | | H04J 14/0282 398/34 |
| 2012/0072973 A1* | 3/2012 | Gao | | H04L 63/0869 726/5 |
| 2012/0183297 A1* | 7/2012 | Rohde | | H04B 10/0731 398/90 |
| 2012/0251122 A1* | 10/2012 | Grobe | | H04J 14/0221 398/95 |
| 2012/0315040 A1* | 12/2012 | Dahlfort | | H04J 14/0246 398/58 |
| 2012/0328287 A1* | 12/2012 | Grosso | | H04J 14/0282 398/34 |
| 2013/0183039 A1* | 7/2013 | Hood | | H04J 14/0234 398/72 |
| 2013/0251364 A1* | 9/2013 | Pachnicke | | H04J 14/0227 398/32 |
| 2013/0336655 A1* | 12/2013 | Grobe | | H04J 14/0246 398/67 |
| 2014/0050479 A1* | 2/2014 | Luo | | H04J 14/02 398/68 |
| 2014/0099105 A1* | 4/2014 | Yan | | H04B 10/0799 398/38 |
| 2014/0219661 A1* | 8/2014 | Doo | | H04J 14/0227 398/68 |
| 2014/0233944 A1* | 8/2014 | Vetter | | H04J 14/0282 398/34 |
| 2014/0233953 A1* | 8/2014 | Giorgi | | H04J 14/02227 398/68 |
| 2014/0233954 A1* | 8/2014 | Lee | | H04J 14/0246 398/72 |
| 2015/0023664 A1* | 1/2015 | Mukai | | H04B 10/272 398/58 |
| 2015/0037027 A1* | 2/2015 | Froc | | H04B 10/2507 398/25 |
| 2015/0037035 A1* | 2/2015 | Sugawa | | H04J 14/0238 398/66 |
| 2015/0055957 A1* | 2/2015 | Lee | | H04J 14/0227 398/79 |
| 2015/0063812 A1* | 3/2015 | Dove | | H04B 10/572 398/67 |
| 2015/0125149 A1* | 5/2015 | Gao | | H04J 14/0246 398/58 |
| 2015/0236797 A1* | 8/2015 | Jeong | | H04Q 11/0005 398/202 |
| 2015/0341137 A1* | 11/2015 | Kaneko | | H04J 14/0245 398/67 |
| 2015/0365191 A1* | 12/2015 | Lee | | H04J 14/0246 398/67 |
| 2015/0381306 A1* | 12/2015 | Wu | | H04B 10/0773 398/67 |
| 2016/0006608 A1* | 1/2016 | Khotimsky | | H04J 14/026 398/48 |
| 2016/0020868 A1* | 1/2016 | Lee | | H04J 14/023 398/58 |
| 2016/0080105 A1* | 3/2016 | Khotimsky | | H04J 14/0232 398/34 |
| 2016/0087749 A1* | 3/2016 | Lawin | | H04Q 11/0066 398/49 |
| 2016/0105736 A1* | 4/2016 | Dai | | H04Q 11/0005 398/49 |
| 2016/0248539 A1* | 8/2016 | Kaneko | | H04J 14/0282 |
| 2016/0269105 A1* | 9/2016 | Yoshida | | H04B 10/032 |
| 2016/0301496 A1* | 10/2016 | Eiselt | | H04J 14/0227 |
| 2017/0064418 A1* | 3/2017 | Tao | | H04B 10/27 |
| 2017/0111137 A1* | 4/2017 | Gao | | H04B 10/27 |
| 2017/0155981 A1* | 6/2017 | Nakagawa | | H04Q 11/0005 |
| 2017/0207875 A1* | 7/2017 | Yoshida | | H04B 10/032 |
| 2017/0237518 A1* | 8/2017 | Yang | | H04J 14/0282 398/79 |
| 2018/0131462 A1* | 5/2018 | Yoshida | | H04L 12/44 |

* cited by examiner

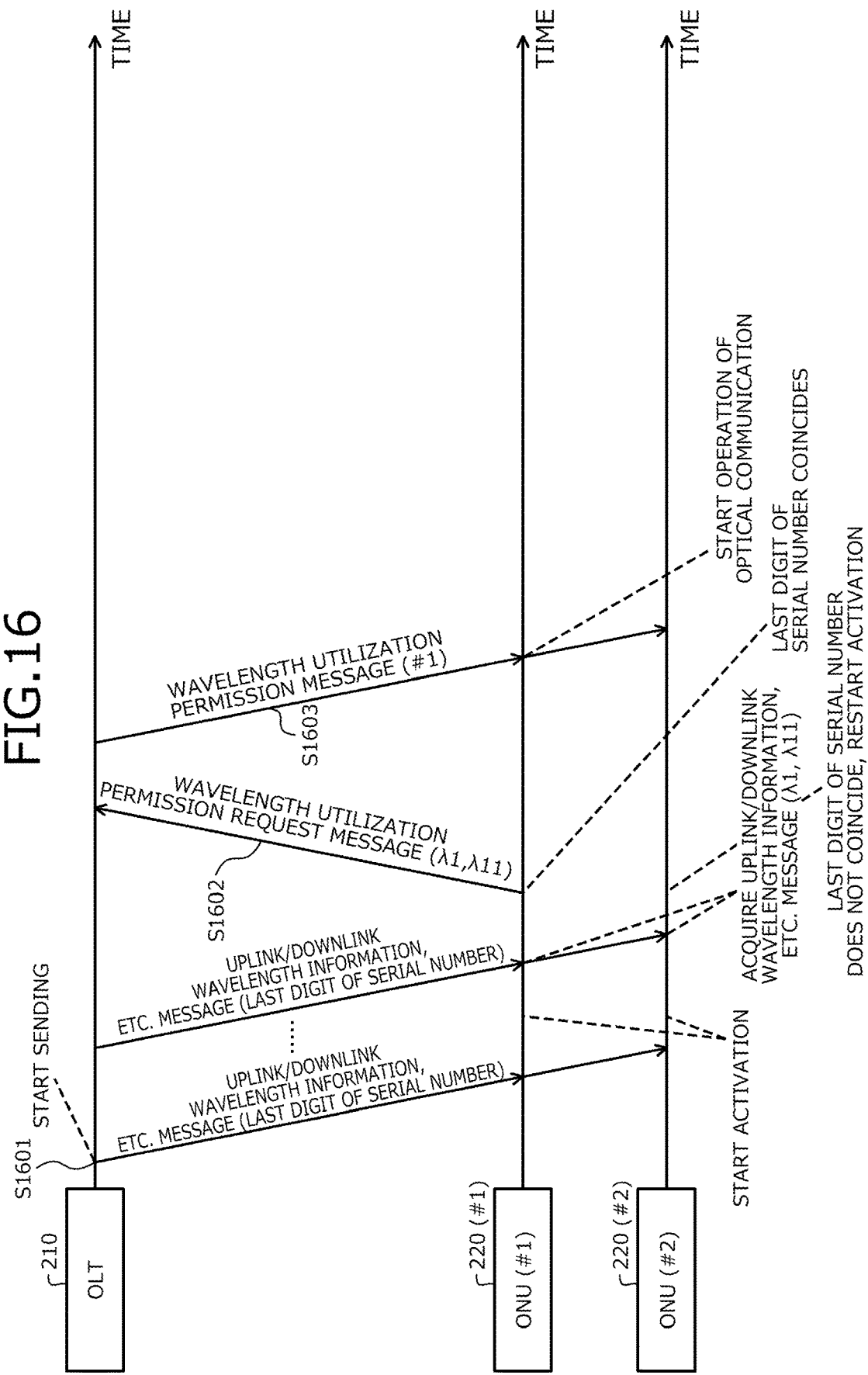

OPTICAL TRANSMISSION APPARATUS, OPTICAL TRANSMISSION SYSTEM, AND OPTICAL TRANSMISSION METHOD

CROSS REFERENCE TO RELATED APPLICATIONS

This application is based upon and claims the benefit of priority of the prior Japanese Patent Application No. 2017-226823, filed on Nov. 27, 2017, the entire contents of which are incorporated herein by reference.

FIELD

Embodiments discussed herein relate to an optical transmission apparatus, an optical transmission system, and an optical transmission method.

BACKGROUND

A PON has been known in which optical transmission is performed between an OLT and plural ONUs connected via an optical splitter (see, for example, International Publication No. WO2017/104075, Japanese Laid-Open Patent Publication No. 2011-109293, and Japanese Laid-Open Patent Publication No. 2004-56237). OLT is an abbreviation of optical line terminal. ONU is an abbreviation of optical network unit. PON is an abbreviation of passive optical network. ONU wavelength configuration by variable wavelength ONUs in a PON, sweeping a wavelength variable filter at the time of startup to detect an idle wavelength and send to an OLT, utilization permission requests for the detected idle wavelength has been studied.

SUMMARY

According to an aspect of an embodiment, an optical transmission apparatus includes a wavelength variable filter whose transmission light wavelength is variable; a receiver that receives light, the light being sent from another optical transmission apparatus and passing through the wavelength variable filter; a transmitter that sends to the another optical transmission apparatus, a utilization permission request for a second wavelength corresponding to a first wavelength of the light received by the receiver, the transmitter sending the utilization permission request as light of the second wavelength and in a form of a tone signal of a predetermined frequency; and a controller that, when receiving from the another optical transmission apparatus, a utilization permission notification of the second wavelength for a sender of the utilization permission request, configures a wavelength of a main signal to the second wavelength, the main signal being sent from the transmitter to the another optical transmission apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is sequence diagram depicting an example of processing in the PON system according to a third embodiment.

DESCRIPTION OF THE INVENTION

First, problems associated with the conventional techniques will be described. The prior art has a problem in that when plural ONUs send wavelength utilization permission requests by the same wavelength, the OLT cannot distinguish the respective utilization permission requests from the ONUs, whereby the wavelengths of the ONUs cannot be configured properly.

Embodiments of an optical transmission apparatus, an optical transmission system, and an optical transmission method according to an embodiment of the present invention will be described in detail with reference to the accompanying drawings.

Figure 1:
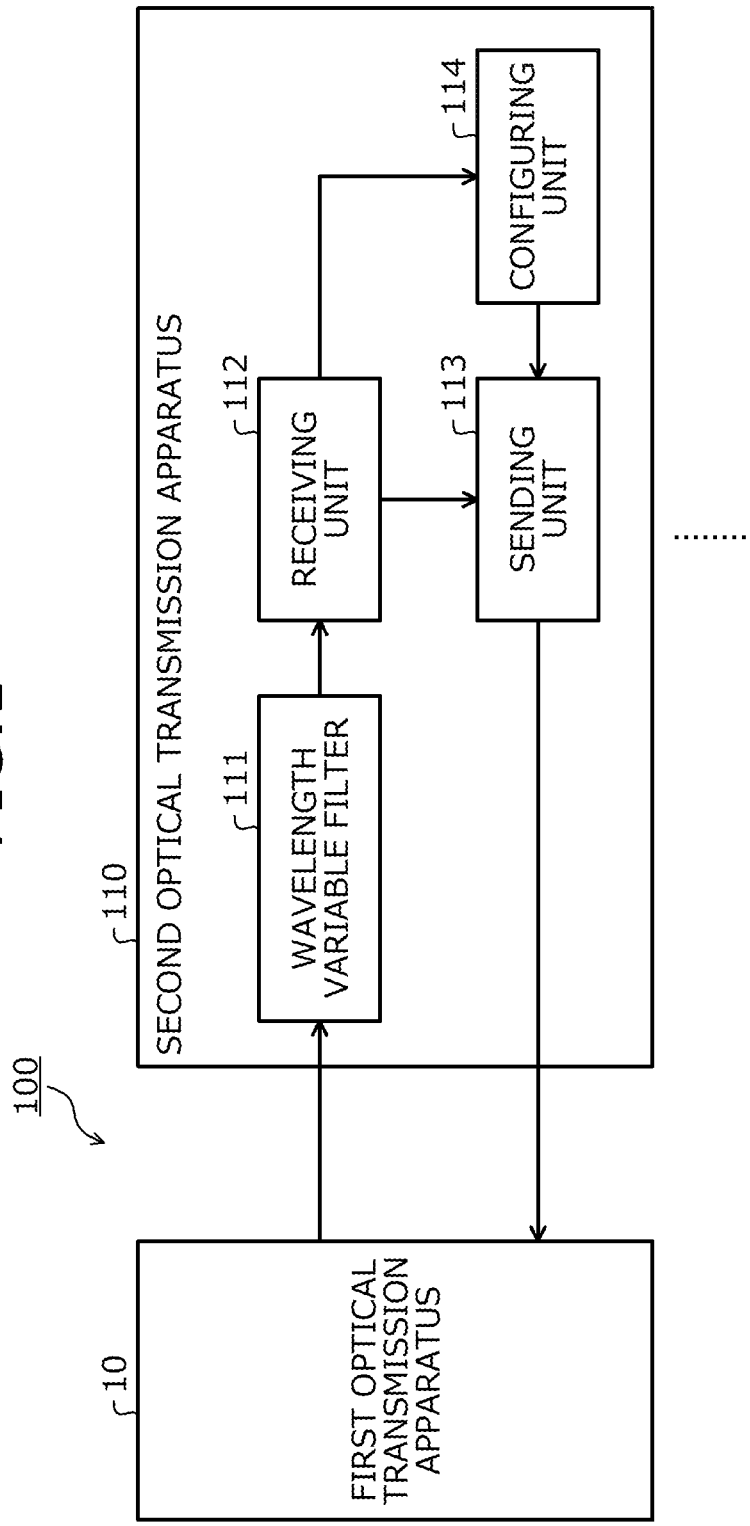
FIG. 1 is a diagram depicting an example of an optical transmission system according to a first embodiment.

FIG. 1 is a diagram depicting an example of an optical transmission system according to a first embodiment. As depicted in FIG. 1, an optical transmission system 100 according to the first embodiment includes a first optical transmission apparatus 10 and plural second optical transmission apparatuses 110. As one example, the optical transmission system 100 is a PON. The first optical transmission apparatus 10 is an optical transmission apparatus capable of performing simultaneous optical transmission with the plural second optical transmission apparatuses 110. As one example, the first optical transmission apparatus 10 is an OLT in the PON.

Each of the second optical transmission apparatuses 110 is an optical transmission apparatus capable of performing optical transmission with the first optical transmission apparatus 10. As an example, each of the second optical transmission apparatuses 110 is the ONU in the PON. For example, the second optical transmission apparatus 110 includes a wavelength variable filter 111, a receiving unit 112, a sending unit 113, and a configuring unit 114.

The wavelength variable filter 111 is an optical bandpass filter whose transmission light wavelength is variable. Light sent from the first optical transmission apparatus 10 enters the wavelength variable filter 111. The receiving unit 112 receives the light that is sent from the first optical transmission apparatus 10 and passes through the wavelength variable filter 111.

The sending unit 113 sends to the first optical transmission apparatus 10, a utilization permission request for a wavelength (second wavelength) corresponding to a wavelength (first wavelength) of light received by the receiving unit 112. The second wavelength corresponding to the first wavelength is a wavelength to be used for an optical signal to the first optical transmission apparatus 10, such as when an optical signal of the first wavelength for optical transmission is received from the first optical transmission apparatus 10. The second wavelength corresponding to the first wavelength is a wavelength indicated by an optical signal (as one example, a message such as uplink/downlink wavelength information, etc. described later) of the first wavelength received by the receiving unit 112. Alternatively, the second wavelength corresponding to the first wavelength may be correlated in advance in the optical transmission system 100 so that information of correlation between the first wavelength and the second wavelength may be stored in the second optical transmission apparatus 110.

The utilization permission request for the second wavelength is a control message that requests the first optical transmission apparatus 10 to send utilization permission for the second wavelength. The sending unit 113 sends the utilization permission request for the second wavelength as light of the second wavelength and in the form of a tone signal of a predetermined frequency. The tone signal is, for example, a signal that is a sine wave of a single wavelength or that is obtained by modulating the sine wave of a single wavelength.

The predetermined frequency is a frequency that may differ from frequencies of the other second optical transmission apparatuses 110. For example, the predetermined frequency is a frequency corresponding to identification information of the second optical transmission apparatuses 110. The identification information of the second optical transmission apparatuses 110 is, as one example, an identification number (e.g., ONU number or serial number described later) uniquely assigned to each of the second optical transmission apparatuses 110 in the optical transmission system 100, for example. The predetermined frequency may be a frequency selected randomly by the second transmission apparatuses 110.

When receiving from the first optical transmission apparatus 10, a utilization permission notification of the second wavelength to the tone signal sender (second optical transmission apparatus 110) of the utilization permission request sent from the sending unit 113, the configuring unit 114 configures the wavelength of a main signal sent from the sending unit 113 to the first optical transmission apparatus 10, to be the second wavelength. The main signal is a signal that includes user data, for example. The sending unit 113 sends the main signal from the second optical transmission apparatus 110 to the first optical transmission apparatus 10 in the form of an optical signal of the second wavelength configured by the configuring unit 114.

The utilization permission notification for the second wavelength is a control message giving notification of permission for use of the second wavelength. The utilization permission notification for the second wavelength is sent as an optical signal of the first wavelength from the first optical transmission apparatus 10, for example. The configuring unit 114 receives this utilization permission notification for the second wavelength via the wavelength variable filter 111 and the receiving unit 112, for example.

The first optical transmission apparatus 10 receives, through FFT or FDT for example, the utilization permission request transmitted as a tone signal from the second optical transmission 110. The FFT is an abbreviation for Fast Fourier Transform. The first optical transmission apparatus 10 then sends the utilization permission notification for the received utilization permission request, as an optical signal of the second wavelength, to the second optical transmission apparatus 110. The utilization permission notification includes information that can specify a destination, i.e., a second optical transmission apparatus 110. The information that can specify a second optical transmission apparatus 110 as a destination is, for example, identification information (e.g. ONU number or serial number) of the second optical transmission apparatus 110 that is the destination, for example. The information that can specify the second optical transmission apparatus 110 that is the destination may be information indicating a frequency of a tone signal of the utilization permission request sent from the second optical transmission apparatus 110 that is the destination, to the first optical transmission apparatus 10.

In the case of receiving tone signals of the utilization permission request for the same wavelength from the plural second optical transmission apparatuses 110, the first optical transmission apparatus 10 selects any second optical transmission apparatus 110 and sends the utilization permission notification to the selected second optical transmission apparatus 110. In the case of receiving tone signals of the utilization permission request for the same wavelength from the plural second optical transmission apparatuses 110, the first optical transmission apparatus 10 may transmit a utilization permission notification to a second optical transmission apparatus 110 that has transmitted a tone signal of the utilization permission request having a higher reception intensity. As a result, the second optical transmission apparatus 110 having a higher light propagation quality can be preferentially permitted to use the wavelength, enabling more efficient activation of the plural second optical transmission apparatuses 110 to be achieved.

In this manner, the second optical transmission apparatus 110 sends to the first optical transmission apparatus 10, a utilization permission request of the second wavelength corresponding to the first wavelength of light received from the first optical transmission apparatus 10, as light of the second wavelength and in the form of a tone signal of a predetermined frequency. Thus, even when utilization permission requests to the first optical transmission apparatus 10 are sent from the plural optical transmission apparatuses 110 at the same timing and at the same wavelength, the first optical transmission apparatus 10 can receive the respective utilization permission requests. For this reason, the first optical transmission apparatus 10 permits one of the second optical transmission apparatuses 110 to use the second wavelength so that the permitted second optical transmission apparatus 110 can perform configuration for the second wavelength.

The utilization permission request may be a control message requesting utilization permission for the first wavelength in addition to utilization permission for the second wavelength. In this case, the utilization permission notification can be a control message giving notification of permission to use the first wavelength in addition to the second wavelength. In this case, when receiving the utilization permission notification of the first wavelength and the second wavelength from the first optical transmission apparatus 10, the configuring unit 114 of the second optical transmission apparatus 110 configures the wavelength of a main signal to the second wavelength, the main signal being sent from the sending unit 113 to the first optical transmission apparatus 10. Furthermore, the configuring unit 114 configures the wavelength of light that the wavelength variable filter 111 transmits, of light sent from the first optical transmission apparatus 10, to the first wavelength.

Accordingly, even when utilization permission requests to the first optical transmission apparatus 10 are sent from the plural optical transmission apparatuses 110 at the same timing and at the same wavelength, the second optical transmission apparatus 110 can perform the configuration of the first wavelength and the second wavelength.

When the predetermined frequency is a random frequency, the plural second optical transmission apparatuses 110 may transmit a utilization permission request for the same wavelength in the form of a tone signal of the same frequency. In this case, since the first optical transmission apparatus 10 cannot receive the respective utilization permission requests from the plural second optical transmission apparatuses 110, the first optical transmission apparatus 10 does not send the utilization permission notification. On the contrary, when no utilization permission notification is received in spite of an elapse of a predetermined amount of time after sending of the utilization permission request, the plural second optical transmission apparatuses 110 retransmit the utilization permission request in the form of a tone signal of a frequency reselected at random, thereby enabling a case in which the same frequency is requested by the utilization permission requests to be eliminated.

Figure 2:
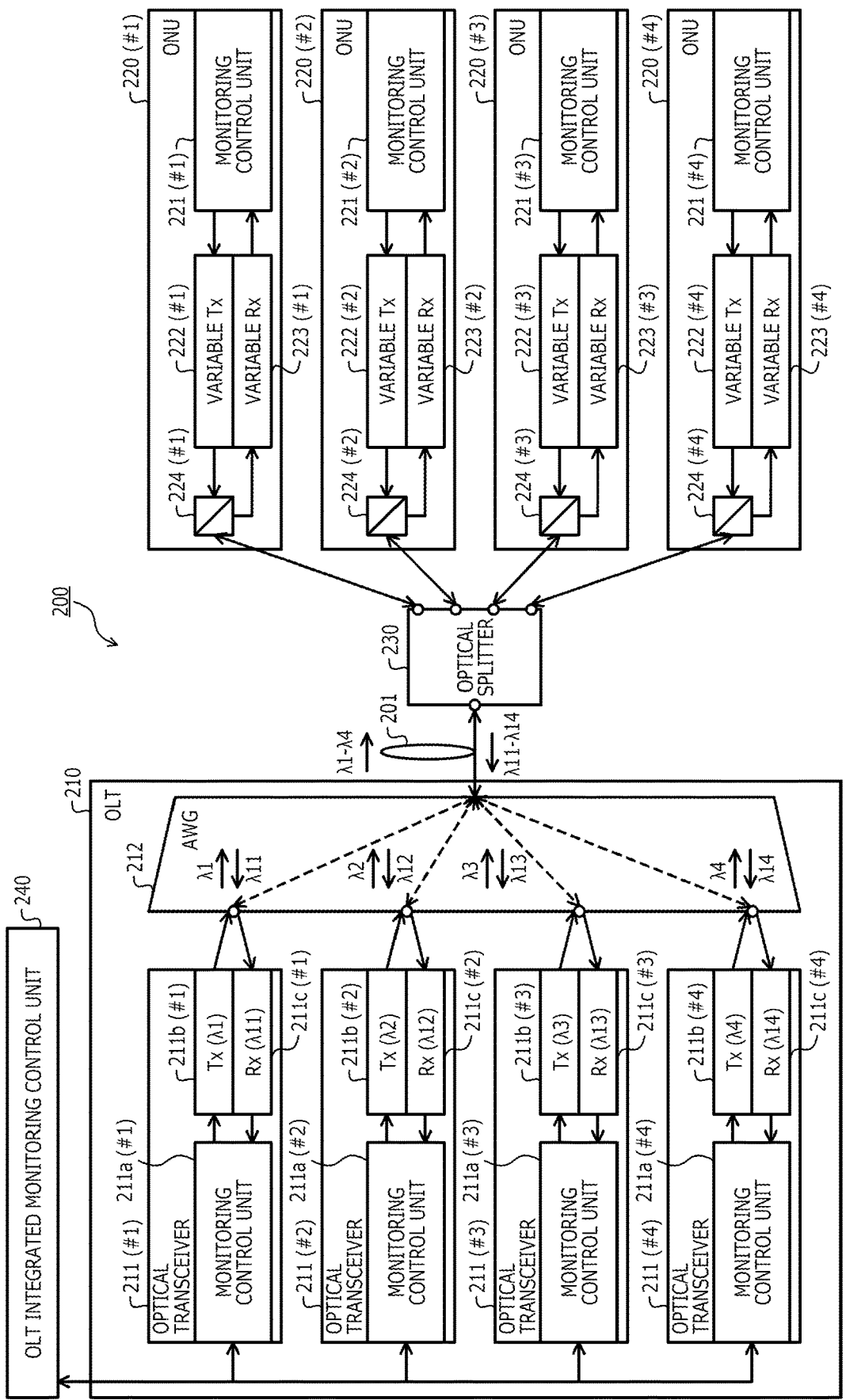
FIG. 2 is a diagram depicting an example of a PON system according to the first embodiment.

FIG. 2 is a diagram depicting an example of a PON system according to the first embodiment. The optical transmission system 100 depicted in FIG. 1 can be implemented by a PON system 200 depicted in FIG. 2, for example. The PON system 200 depicted in FIG. 2 is, for example, an NG-PON2, which is an abbreviation for next generation PON2.

The PON system 200 includes an OLT 210, four ONUs 220 (#1 to #4), an optical transmission path 201, an optical splitter 230, and an OLT integrated monitoring control unit 240. The transmission direction from the OLT 210 toward the ONUs 220 (#1 to #4) is referred to as downlink, while the transmission direction from the ONUs 220 (#1 to #4) toward the OLT 210 is referred to as uplink. The first optical transmission apparatus 10 depicted in FIG. 1 can be implemented by the OLT 210, for example. The plural second optical transmission apparatuses 110 depicted in FIG. 1 can be implemented by the ONUs 220 (#1 to #4), for example.

In the example depicted in FIG. 2, the OLT 210 includes four optical transceivers 211 (#1 to #4) and an AWG 212. The OLT 210 may include an integrated monitoring control unit that monitors and controls optical transmission of each of the optical transceivers 211 (#1 to #4). The AWG is an abbreviation for arrayed waveguide grating.

The optical transceivers 211 (#1 to #4) send optical signals to the ONUs 220 (#1 to #4) by using wavelengths λ1 to λ4, respectively. The optical transceivers 211 (#1 to #4) receive optical signals sent from the ONUs 220 (#1 to #4) using wavelengths λ11 to λ14.

For example, the optical transceiver 211 (#1) includes a monitoring control unit 211a (#1), a sending unit 211b (#1), and a receiving unit 211c (#3). The monitoring control unit 211a (#1) monitors and controls optical transmission of the sending unit 211b (#1) and the receiving unit 211c (#1).

The sending unit 211b (#1) is a transmitter (Tx) that, under control from the monitoring control unit 211a (#1), generates an optical signal of a wavelength λ1 and outputs the generated optical signal to the AWG 212. Also in the idle state of not performing data communication, the sending unit 211b (#1) may generate and output to the AWG 211, a blank optical signal that does not include data. The sending unit 211b (#1) can be implemented by a laser diode (LD) or a modulator, for example.

The receiving unit 211c (#1) is a receiver (Rx) that receives an optical signal of the wavelength λ11 output from the AWG 212. The receiving unit 211c (#1) outputs the received signal to the monitoring control unit 211a (#1). The receiving unit 211c (#1) can be implemented by a photo detector (PD) or a demodulator, for example.

Although the configuration of the optical transceiver 211 (#1) has been described, the configuration of the optical transceivers 211 (#2 to #4) is also similar to that of the optical transceiver 211 (#1). Note that the sending units 211b (#2 to #4) of the optical transceivers 211 (#2 to #4) generate and output optical signals of the wavelengths λ2 to λ4, respectively. The receiving units 211c (#2 to #4) of the optical transceivers 211 (#2 to #4) receive optical signals of the wavelengths λ12 to λ14.

The AWG 212 wavelength-multiplexes the optical signals of the wavelengths λ1 to λ4 output from the optical transceivers 211 (#1 to #4). The AWG 212 then sends the wavelength-multiplexed optical signals via the optical transmission path 201 to the optical splitter 230. The optical transmission path 202 is an optical waveguide such as an optical fiber. The AWG 212 wavelength-demultiplexes optical signals transmitted via the optical transmission path 201 from the optical splitter 230, into signals of the wavelengths λ11 to λ14. The AWG 212 then outputs the wavelength-demultiplexed optical signals of the wavelengths λ11 to λ14 to the ONUs 220 (#1 to #4), respectively.

The optical splitter 230 branches the optical signal transmitted via the optical transmission path 201 from the OLT 210. The optical splitter 230 then sends branched optical signals to the ONUs 220 (#1 to #4), respectively. The optical splitter 230 combines (wavelength-multiplexes) the optical signals of the wavelengths λ11 to λ14 sent from the ONUs 220 (#1 to #4). The optical splitter 230 then sends the combined optical signal via the optical transmission path 201 to the OLT 210.

The ONUs 220 (#1 to #4) receive optical signals sent from the OLT 210 (#1 to #4). The ONUs 220 (#1 to #4) send the optical signals to the OLT 210 (#1 to #4) by using variable wavelengths, respectively.

For example, the ONU 220 (#1) includes a monitoring control unit 221 (#1), a sending unit 222 (#1), a receiving unit 223 (#1), and a wavelength filter 224 (#1). The monitoring control unit 221 (#1) monitors and controls optical transmission of the sending unit 222 (#1) and the receiving unit 223 (#1).

The sending unit 222 (#1) is a transmitter (Tx) that, under control from the monitoring control unit 221 (#1), generates an optical signal of a variable wavelength and outputs the generated optical signal to the wavelength filter 224 (#1). Also in the idle state not performing data communication, the sending unit 222 (#1) may generate a blank optical signal that does not includes data and output the blank optical signal to the wavelength filter 224 (#1). The sending unit 222 (#1) can be implemented by the LD or the modulator for example.

The receiving unit 223 (#1) is a receiver (variable Rx) that receives an optical signal output from the wavelength filter 224 (#1). The wavelength of light received by the receiving unit 223 (#1) is variable. The receiving unit 223 (#1) outputs the received signal to the monitoring control unit 221 (#1). The receiving unit 223 (#1) can be implemented by the wavelength filter, the PD, or the demodulator, for example.

The wavelength filter 224 (#1) sends an optical signal output from the sending unit 222 (#1), to the optical splitter 230. The wavelength filter 224 (#1) outputs an optical signal sent from the optical splitter 230, to the receiving unit 223 (#1). The wavelength filter 224 can be implemented by, for example, a filter that transmits light of the wavelengths $\lambda 11$ to $\lambda 14$ and reflects light of wavelengths $\lambda 1$ to $\lambda 4$.

The wavelength variable filter 111 and the receiving unit 112 of the second optical transmission apparatus 110 depicted in FIG. 1 can be implemented by the receiving unit 223 (#1), for example. The sending unit 113 of the second optical transmission apparatus 110 depicted in FIG. 1 can be implemented by the sending unit 222 (#1) and the monitoring control unit 221 (#1), for example. The configuring unit 114 of the second optical transmission apparatus 110 depicted in FIG. 1 can be implemented by the monitoring control unit 221 (#1), for example.

Although the configuration of the ONU 220 (#1) has been described, the configuration of the ONUs 220 (#2 to #4) is also similar to that of the ONU 220 (#1).

The OLT integrated monitoring control unit 240 monitors and controls optical signal sending/receiving of the optical transceivers 211 (#1 to #4) of the OLT 210. The OLT integrated monitoring control unit 240 may monitor and control the optical signal sending/receiving of plural OLTs including the OLT 210.

In the example depicted in FIG. 2, while a configuration has been described where four each of the optical transceivers 211 and the ONUs 220 are provided, and in the uplink and the downlink, four wavelengths are respectively used, the number of wavelengths used respectively for the uplink and the downlink can be any number of 2 or more. For example, configuration may be such that 40 optical transceivers 211 and 40 ONUs 220 are provided and in the uplink and the downlink, 40 wavelengths are used. Configuration may be such that 80 optical transceivers 211 and 80 ONUs 220 are provided and in the uplink and the downlink, 80 wavelengths are used.

Figure 3:
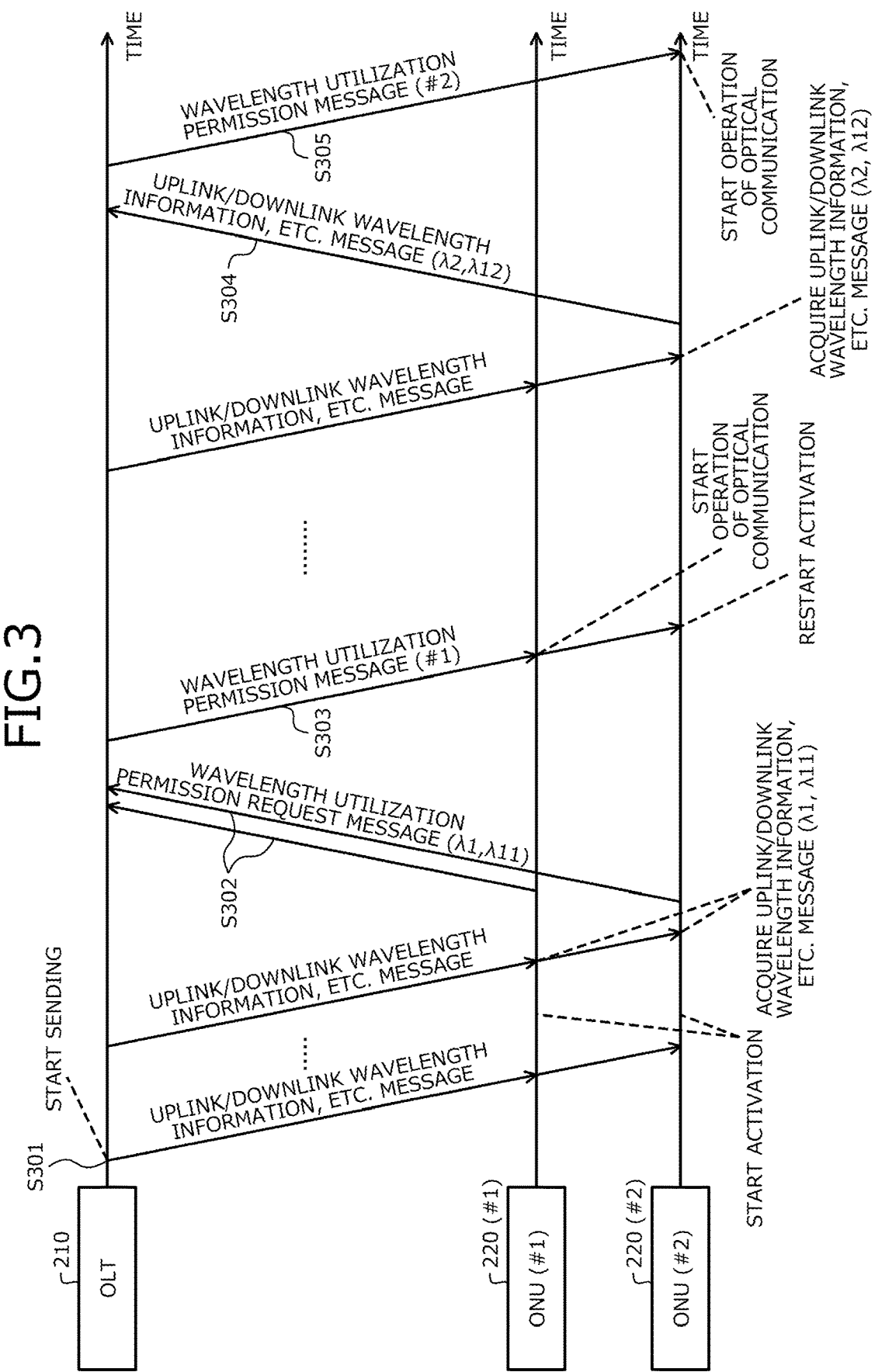
FIG. 3 is a sequence diagram depicting an example of processing in the PON system according to the first embodiment.

FIG. 3 is a sequence diagram depicting an example of processing in the PON system according to the first embodiment. In the PON system 200 depicted in FIG. 2, steps depicted in FIG. 3, for example, are executed. In the example depicted in FIG. 3, a case will be described where the ONUs 220 (#1 and #2) perform activation of the OLT 210.

First, the OLT 210 starts periodic transmission of an uplink/downlink wavelength information, etc. message to the ONU 220 connected thereto, at each of idle wavelengths (the optical transceivers 211) thereof (step S301). The transmission of the uplink/downlink wavelength information, etc. message can be performed by a signal superimposed on a main signal, for example. The superimposed signal can be superimposed on the main signals by, for example, modulating the main signal at a low frequency at an electrical stage or an optical stage. The superimposed signal can be an AMCC signal, for example. AMCC is an abbreviation for auxiliary management and control channel.

For example, assume that the optical transceivers 211 (#1 and #2) are inactive among the optical transceivers 211 (#1 to #4) of the OLT 210 depicted in FIG. 2. In this case, the OLT 210 allows the optical transceiver 211 (#1) to periodically transmit, at the frequency $\lambda 1$, an uplink/downlink wavelength information, etc. message indicating that the downlink wavelength $\lambda 1$ is idle and that the uplink wavelength corresponding to the downlink wavelength $\lambda 1$ is the wavelength $\lambda 11$. The OLT 210 allows the optical transceiver 211 (#2) to periodically transmit, at the wavelength $\lambda 2$, an uplink/downlink wavelength information, etc. message indicating that the downlink wavelength $\lambda 2$ is idle and that the uplink wavelength corresponding to the downlink wavelength $\lambda 2$ is the wavelength $\lambda 12$. The uplink/downlink wavelength information, etc. message is a Channel_Profile message, for example.

Next, assume that the ONUs (#1 and #2) start the activation at the same time. In this case, the ONUs 220 (#1 and #2) each sweep the reception wavelength (the wavelength variable filter) for light sent from the OLT 210, to thereby detect a main signal and a superimposed signal from the OLT 210.

In the example depicted in FIG. 3, assume that each of the ONUs 220 (#1 and #2) first detect an optical signal and a superimposed signal from the optical transceiver 211 (#1), by the sweep of the reception wavelength. In this case, each of the ONUs 220 (#1 and #2) synchronizes the detected main signal and superimposed signal, and acquires an uplink/downlink wavelength information, etc. message included in the synchronized superimposed signal. This uplink/downlink wavelength information, etc. message indicates, as described above, that the downlink wavelength $\lambda 1$ is idle and that the uplink wavelength corresponding to the downlink wavelength $\lambda 1$ is the wavelength $\lambda 11$.

Based on the acquired uplink/downlink wavelength information, etc. message, each of the ONUs 220 (#1 and #2) determines that the wavelength $\lambda 1$ is idle, and configures the downlink wavelength used in communication with the OLT 210, to the wavelength $\lambda 1$. Configuration of the downlink wavelength can be performed by keeping the configuration of the reception wavelength (the wavelength variable filter) at that time, for example. Based on the acquired uplink/downlink wavelength information, etc. message, each of the ONUs 220 (#1 and #2) configures the uplink wavelength used in communication with the OLT 210, to the wavelength $\lambda 11$.

Next, each of the ONUs 220 (#1 and #2) sends a wavelength utilization permission request message requesting utilization permission for the wavelengths $\lambda 1$ and $\lambda 11$, in the form of a tone signal of the wavelength $\lambda 11$, to the OLT 210 (step S302). This tone signal is an optical signal obtained by modulating a sine wave of a single frequency on the basis of the wavelength utilization permission request message. The ONUs 220 (#1 and #2) configure the tone signal frequency (sine wave frequency) at which the wavelength utilization permission request message is sent, to a frequency that has one-to-one correspondence with identification information specific to the ONUs 220 (#1 and #2). The identification information specific to the ONUs 220 (#1 and #2) is, for example, an ONU No. assigned to each of ONUs 220 connected to the PON system 200. The wavelength utilization permission request message is, for example, a Serial- _Number_ONU message including a serial number, etc. of the ONU 220 that is the sender of the wavelength utilization permission request message.

Since the respective wavelength utilization permission request messages sent from the ONUs 220 (#1 and #2) at step S302 have the wavelength $\lambda 11$, the messages are received by the optical transceiver 211 (#1) that uses the wavelength $\lambda 11$ for uplink. The tone signals of the wavelength utilization permission request messages sent from the ONUs 220 (#1 and #2) at step S302 are tone signals having frequencies different from each other. For this reason, the optical transceiver 211 (#1) can receive the wavelength utilization permission request messages separately by frequency.

Next, the OLT 210 selects one of the received wavelength utilization permission request messages. In the example depicted in FIG. 3, the OLT 210 selects the wavelength utilization permission request message from the ONU 220 (#1). At this time, the OLT 210 may authenticate the ONU 220 (#1), based on authentication information such as a serial number included in the wavelength utilization permission request message from the ONU 220 (#1).

Next, the OLT 210 sends a wavelength utilization permission message permitting use of the wavelengths $\lambda 1$ and $\lambda 11$, to the ONU 220 (#1) that is the sender of the selected wavelength utilization permission request message (step S303). This wavelength utilization permission request message is send at the downlink wavelength $\lambda 1$ from the optical transceiver 211 (#1). The sending of the wavelength utilization permission request message can be performed by a signal superimposed on the main signal, for example. The sending of the wavelength utilization permission request message can be performed by a signal (e.g. AMCC signal) superimposed on the main signal, for example.

For example, the wavelength utilization permission request message includes a tone No. indicative of a tone signal frequency of the wavelength utilization permission request message selected by the OLT 210. When sender ONU identification information (e.g., ONU No.) is included in the wavelength utilization permission request message, the wavelength utilization permission request message may include identification information of the ONU 220 (#1) that is the sender of the wavelength utilization permission request message selected by the OLT 210. The wavelength utilization permission request message is, for example, an Assign_ONU_ID message that includes the ONU identification information. Since the wavelength of the wavelength utilization permission request message transmitted at step S303 is a wavelength $\lambda 1$, the message is received by each of the ONUs 220 (#1 and #2) whose downlink wavelength is configured to the wavelength $\lambda 1$.

Based on the wavelength utilization permission request message received from the OLT 210, the ONU 220 (#1) determines that the ONU 220 (#1) has been permitted to use the wavelengths $\lambda 1$ and $\lambda 11$. Therefore, the ONU 220 (#1) completes the activation and starts operation of optical communication with the OLT 210 using the wavelengths $\lambda 1$ and $\lambda 11$. On the other hand, based on the wavelength utilization permission request message received from the OLT 210, the ONU 220 (#2) determines that the ONU 220 (#2) has not been permitted to use the wavelengths $\lambda 1$ and $\lambda 11$. Accordingly, the ONU 220 (#2) restarts the activation.

For example, the OLT 210 stops the periodic sending of the uplink/downlink wavelength information, etc. message from the optical transceiver 211 (#1) that has come into use. On the other hand, the OLT 210 continues the periodic transmission of the uplink/downlink wavelength information, etc. message from the inactive optical transceiver 211 (#2). The ONU 220 (#2) restarting the activation resweeps the reception wavelength of light sent from the OLT 210, to thereby detect a main signal and a superimposed signal from the OLT 210.

Then, assume that the ONU 220 (#2) has detected an optical signal and a superimposed signal from the optical transceiver 211 (#2). In this case, the ONU 220 (#2) synchronizes the detected main signal and superimposed signal, and acquires an uplink/downlink wavelength information, etc. message included in the synchronized superimposed signal. This uplink/downlink wavelength information, etc. message indicates, as described above, that the downlink wavelength $\lambda 2$ is idle and that the uplink wavelength corresponding to the downlink wavelength $\lambda 2$ is the wavelength $\lambda 12$.

Based on the acquired uplink/downlink wavelength information, etc. message, the ONU 220 (#2) determines that the wavelength $\lambda 2$ is idle, and configures the downlink wavelength for use in communication with the OLT 210, to the wavelength $\lambda 2$. Based on the acquired uplink/downlink wavelength information, etc. message, the ONU 220 (#2) configures the uplink wavelength for use in communication with the OLT 210, to the wavelength $\lambda 12$.

The ONU 220 (#2) then sends to the OLT 210, a wavelength utilization permission request message requesting utilization permission for the wavelengths $\lambda 2$ and $\lambda 12$, as a tone signal of the wavelength $\lambda 12$ (step S304). Similar to step S302, the ONU 220 (#2) configures the tone signal frequency (sine wave frequency) at which the wavelength utilization permission request message is sent, to a frequency that has one-to-one correspondence with identification information specific to the ONU 220 (#2).

Since the wavelength is the wavelength $\lambda 12$, the wavelength utilization permission request message sent from the ONU 220 (#2) at step S304 is received by the optical transceiver 211 (#2) that uses the uplink wavelength $\lambda 12$. Since the tone signal of the wavelength utilization permission request message transmitted at step S304 is a single tone signal, the optical transceiver 211 (#2) can receive this wavelength utilization permission request message. At this time, the OLT 210 may authenticate the ONU 220 (#2), based on authentication information such as serial number, etc. included in the wavelength utilization permission request message from the ONU 220 (#2).

The OLT 210 then sends a wavelength utilization permission message permitting use of the wavelengths $\lambda 2$ and $\lambda 12$, to the ONU 220 (#2) that is the sender of the received wavelength utilization permission request message (step S305). This wavelength utilization permission message is transmitted at the downlink wavelength $\lambda 2$ from the optical transceiver 211 (#2).

Based on the wavelength utilization permission message received from the OLT 210, the ONU 220 (#2) determines that the ONU 220 (#2) has been permitted to use the wavelengths $\lambda 2$ and $\lambda 12$. Accordingly, the ONU 220 (#2) completes the activation and starts the operation of optical communication with the OLT 210 using the wavelengths $\lambda 2$ and $\lambda 12$.

Figure 4:
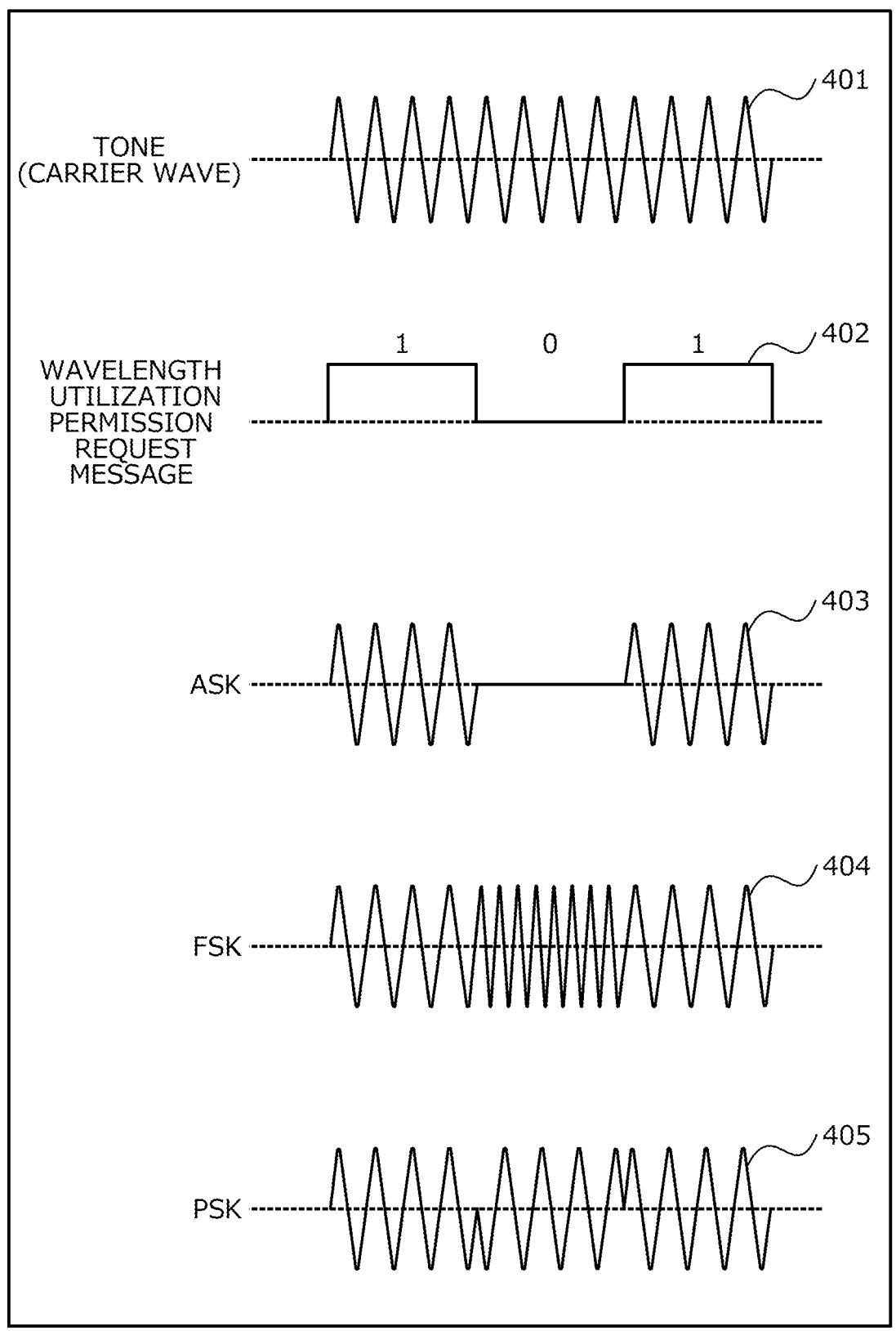
FIG. 4 is a diagram depicting an example of a tone signal wavelength according to the first embodiment.

FIG. 4 is a diagram depicting an example of the tone signal wavelength according to the first embodiment. In FIG. 4, a lateral direction represents time. A tone 401 is a sine wave of a single frequency. This single frequency is, for example, a frequency corresponding to the identification information (e.g., ONU number) specific to the ONU 220 that is the sender of the tone 401.

A wavelength utilization permission request message 402 depicted in FIG. 4 is the wavelength utilization permission request message (e.g., Serial_Number_ONU message) described above. In the example depicted in FIG. 4, while the wavelength utilization permission request message 402 is "101", the wavelength utilization permission request message 402 can be information of any length. The wavelength utilization permission request message 402 may include the serial number, etc. of the sender ONU 220, as described above.

The above tone signal of the wavelength utilization permission request message can be one of tone signals 403 to 405 whose carrier wave is the tone 401, for example. Each of the tone signals 403 to 405 is a signal obtained by modulating the tone 401, for example.

The tone signal 403 is a signal obtained by modulating the tone 401 with ASK, based on the wavelength utilization permission request message 402. ASK is an abbreviation for amplitude shift keying. The tone signal 404 is a signal obtained by modulating the tone 401 with FSK, based on the wavelength utilization permission request message 402. FSK is an abbreviation for frequency shift keying. The tone signal 405 is a signal obtained by modulating the tone 402 with PSK, based on the wavelength utilization permission request message 402. PSK is an abbreviation for phase shift keying.

Figure 5:
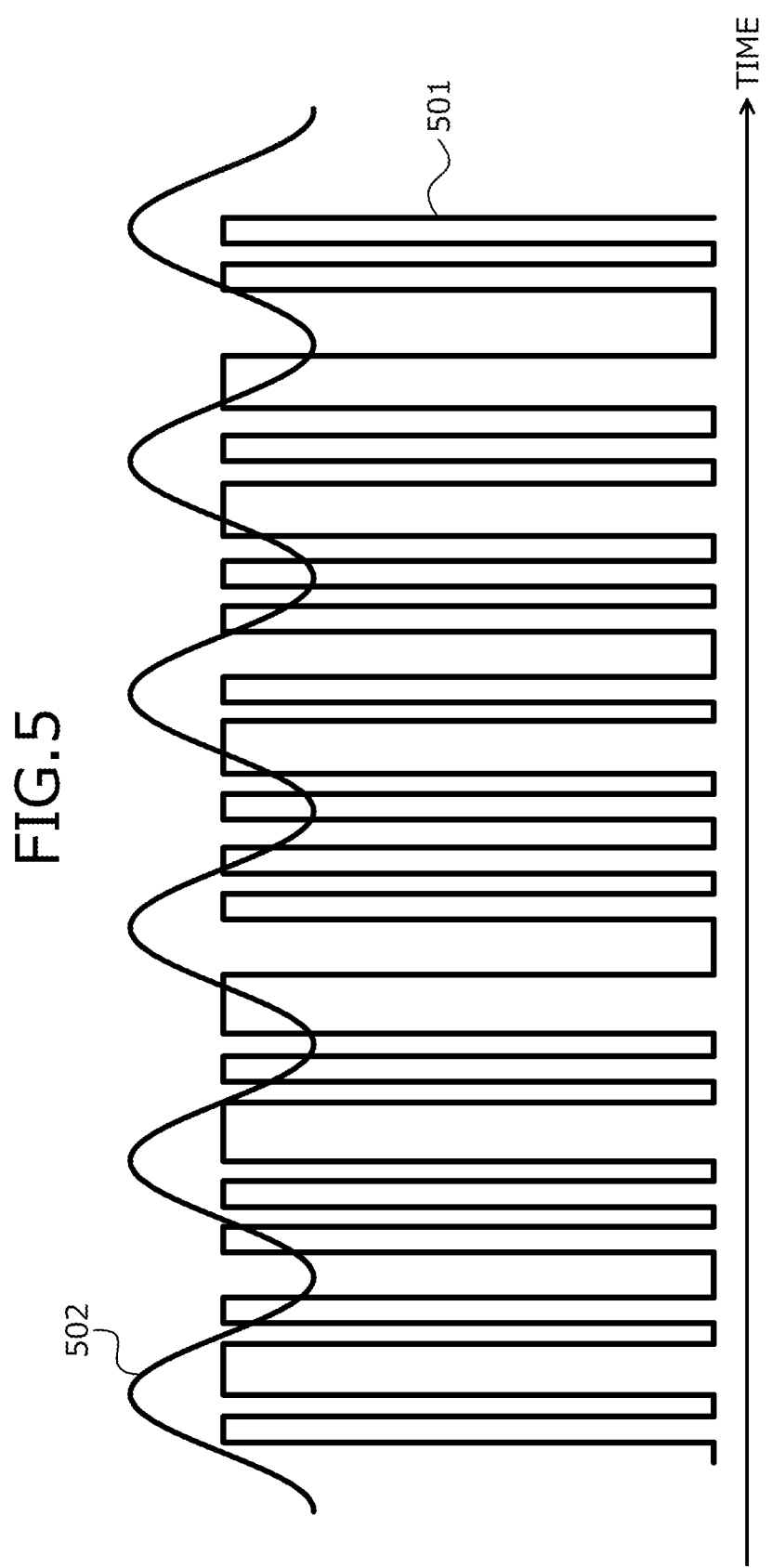
FIG. 5 is a diagram depicting an example of superimposing a tone signal onto a main signal, according to the first embodiment.

FIG. 5 is a diagram depicting an example of superimposing a tone signal onto a main signal, according to the first embodiment. In FIG. 5, a horizontal axis represents time. A main signal 501 depicted in FIG. 5 is a main signal sent to the OLT 210 from the ONU 220 that is the sender of the wavelength utilization permission request message. Note that, since the ONU 220 sending the wavelength utilization permission request message has not started the operation of optical communication with the OLT 210 at that point of time, the main signal 501 is a blank signal, for example.

A tone signal 502 depicted in FIG. 5 is a tone signal of a wavelength utilization permission request message superimposed on the main signal 501. The tone signal 502 can be any one of the tone signals 403 to 405 depicted in FIG. 4, for example. Alternatively, the tone 401 depicted in FIG. 4 may be used as is, as the tone signal 502 (see e.g. FIG. 7). For example, the ONU 220 can superimpose the tone signal 502 onto the main signal 501 by modulating the main signal 501 at the electrical stage or the optical stage.

As depicted in FIG. 5, the frequency of the tone signal 502 is a frequency lower than the modulation frequency of the main signal 501. Therefore, the OLT 210 can receive both the main signal 501 and the tone signal 502 by the frequency separation.

Figure 6:
FIG. 6 is a diagram depicting an example of information of correspondence between an ONU number and tone signal frequency, according to the first embodiment.

FIG. 6 is a diagram depicting an example of information of correspondence between the ONU number and the tone signal frequency, according to the first embodiment. In the PON system 200, as in correspondence information 600 depicted in FIG. 6, the ONU number specific to each of the ONUs 220 is correlated with the tone signal frequency [kHz].

In the example depicted in FIG. 6, a maximum of 64 ONUs 220 are available in the PON system 200, with ONU numbers "ONU0" to "ONU63" being assigned to the 64 ONUs 220, respectively. The ONU numbers "ONU0" to "ONU63" are correlated with different frequencies, respectively.

When, for example, the ONU number of the ONU 220 (#1) is "ONU0", the ONU 220 (#1) sends to the OLT 210, the wavelength utilization permission request message in the form of a tone signal of 500 [kHz] corresponding to "ONU0". Based on whether, for example, "ONU0" is included in the wavelength utilization permission message from the OLT 210, the ONU 220 (#1) determines that the OLT 210 has been permitted the ONU 220 (#1) to use the wavelength in response to the wavelength utilization permission request message sent to the OLT 210.

When the ONU number of the ONU 220 (#2) is "ONU1", the ONU 220 (#2) sends to the OLT 210, the wavelength utilization permission request message in the form of a tone signal of 510 [kHz] corresponding to "ONU1". Based on whether, for example, "ONU1" is included in the wavelength utilization permission message from the OLT 210, the ONU 220 (#2) determines that the OLT 210 has been permitted the ONU 220 (#2) to use the wavelength in response to the wavelength utilization permission request message sent to the OLT 210.

For example, each of the ONUs 220 (#1 to #4) depicted in FIG. 2 stores the correspondence information 600 depicted in FIG. 6 and identifies the frequency of a tone signal corresponding to the ONU number thereof, based on the correspondence information 600. Alternatively, each of the ONUs 220 (#1 to #4) stores the tone signal frequency corresponding to the ONU number thereof and may not store the tone signal frequencies corresponding to the ONU numbers of the other ONUs 220. The OLT 210 may store the correspondence information 600 and identify the ONU number of the ONU 220 that is the sender of the received tone signal, based on the frequency of the received tone signal.

Figure 7:
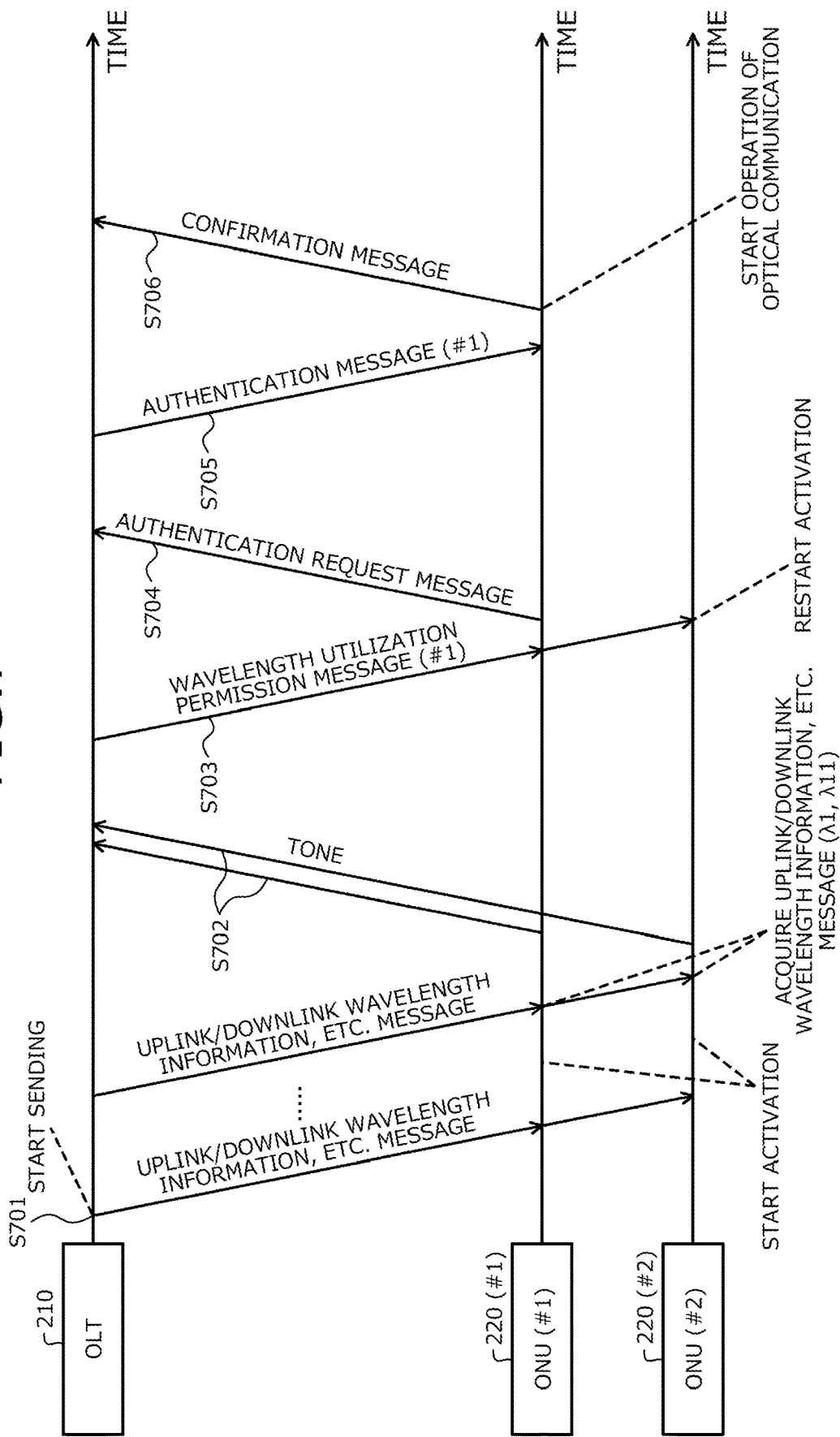
FIG. 7 is a sequence diagram depicting another example of processing in the PON system according to the first embodiment.

FIG. 7 is a sequence diagram depicting another example of processing in the PON system according to the first embodiment. The PON system 200 depicted in FIG. 2 may execute the steps depicted in FIG. 3, for example. In the example depicted in FIG. 7, a case will be described where the ONUs 220 (#1 and #2) perform the activation of the OLT 210.

Steps S701 to S703 depicted in FIG. 7 are similar to the steps S301 to S303 depicted in FIG. 3. It is to be noted at step S702 that each of the ONUs 220 (#1 and #2) sends to the OLT 210, the tone signal 401 (see FIG. 4) of the wavelength λ11 as the wavelength utilization permission request message requesting utilization permission for the wavelengths λ1 and λ11 (step S702). Accordingly, this wavelength utilization permission request message does not include the serial numbers, etc. of the ONUs 220 (#1 and #2), so that the OLT 210 cannot identify the serial numbers, etc. of the ONUs 220 (#1 and #2) that are the senders of the wavelength utilization permission request message.

Subsequent to step S703, the ONU 220 (#1) sends an authentication request message including the serial number, etc. of the ONU 220 (#1), to the OLT 210, at the wavelength λ11 (step S704). The authentication request message can be a Serial_Number_ONU#1 message that includes authentication information such as the serial number of the ONU 220 (#1), for example.

Next, based on the authentication request message from the ONU 220 (#1), the OLT 210 authenticates the ONU 220 (#1) and sends an authentication message indicative of the authentication result, at the wavelength λ1, to the ONU 220 (#1) (step S705). Next, the ONU 220 (#1) sends a confirmation message responding to the received authentication message, at the wavelength λ11, to the OLT 210 (step S706). The ONU 220 (#1) then completes the activation and starts the operation of optical communication with the OLT 210 using the wavelengths λ1 and λ11.

On the other hand, the ONU 220 (#2) determines that the ONU 220 (#2) has not been permitted to use the wavelengths λ1 and λ11, based on the wavelength utilization permission message received from the OLT 210 at step S703. Thus, the ONU 220 (#2) restarts the activation. The ONU 220 (#2) then uses a detected idle wavelength to perform a procedure similar to that at the steps S703 to S706 and starts the operation of optical communication with the OLT 210 after completion of the activation.

As depicted in FIG. 7, each of the ONUs 220 (#1 and #2) may send the tone 401 as the wavelength utilization permission request message to the OLT 210. In this case, when receiving the tone 401, the OLT 210 determines that the ONU 220 that is the sender of the tone 401 requests the OLT 210 for use of the wavelength of the tone 401 as the uplink wavelength and use of a wavelength corresponding to the wavelength as the downlink wavelength.

In this case, the ONU 220, which is permitted to use the wavelength by the wavelength utilization permission message from the OLT 210, sends to the OLT 210, the authentication request message that includes the serial number of the ONU 220. This enables the ONU 220, which is permitted to use the wavelength by the OLT 210, to be authenticated. Transmission of the confirmation message at step S706 for example may be omitted.

Figure 8:
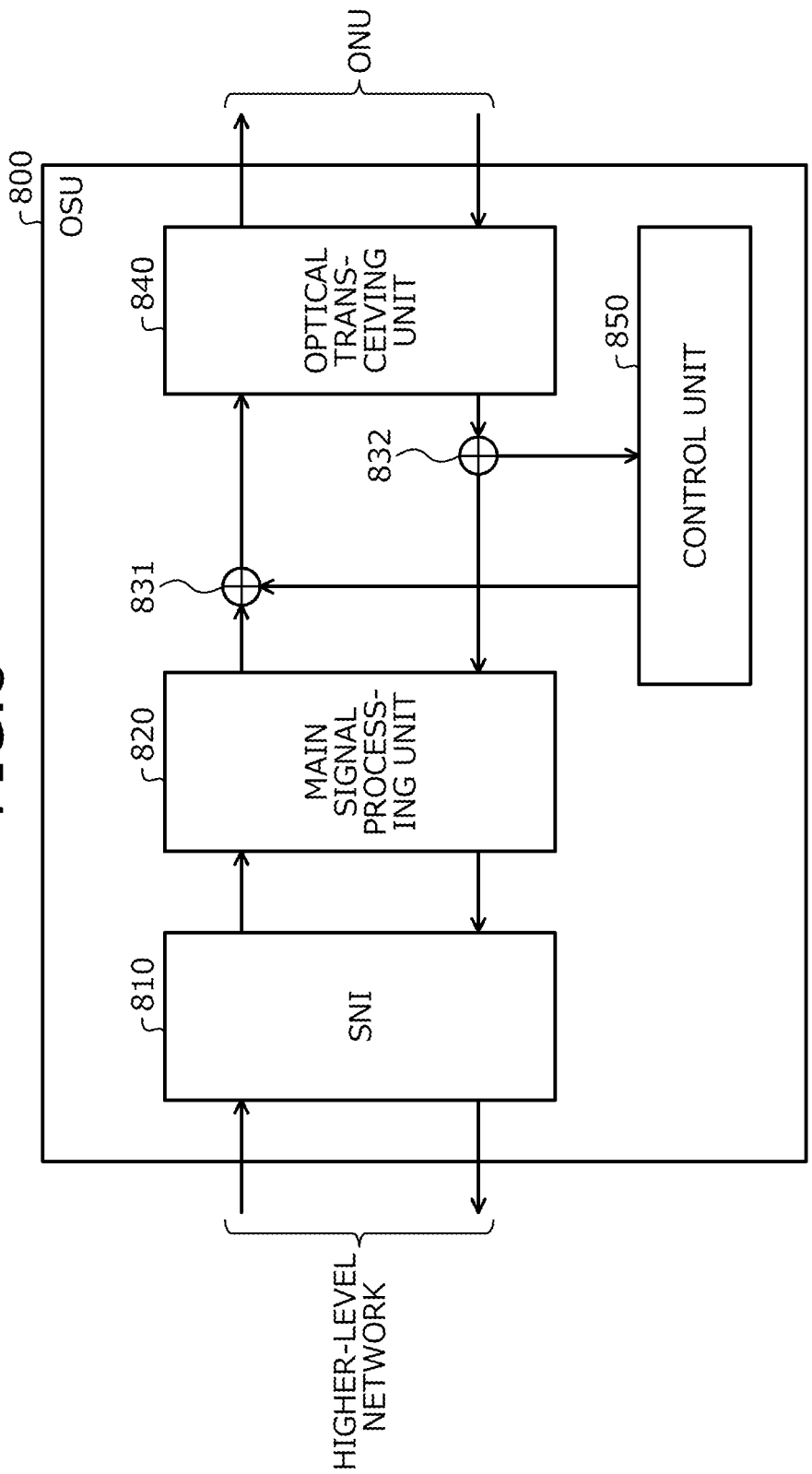
FIG. 8 is a diagram depicting an example of the optical transceivers of an OLT according to the first embodiment.

FIG. 8 is a diagram depicting an example of the optical transceivers of the OLT according to the first embodiment. Each of the optical transceivers 211 (#1 to #4) of the OLT 210 depicted in FIG. 2 can be implemented by an OSU 800 depicted in FIG. 8. OSU is an abbreviation for optical subscriber unit. The OSU 800 includes an SNI 810, a main signal processing unit 820, a superimposing unit 831, a superimposition separating unit 832, an optical transceiving unit 840, and a control unit 850. SNI is an abbreviation for application server network interface.

The SNI 810 is a communication interface of a network connected to a higher-level network. For example, the SNI 810 receives a downlink main signal sent from the higher-level network and outputs the received downlink main signal to the main signal processing unit 820. The SNI 810 processes an uplink main signal output from the main signal processing unit 820 and sends the processed uplink main signal to the higher-level network.

The main signal processing unit 820 processes a downlink main signal output from the SNI 810 and outputs the processed downlink main signal to the superimposing unit 831. The main signal processing unit 820 processes the uplink main signal output from the superimposition separating unit 832 and outputs the processed uplink main signal to the SNI 810.

The superimposing unit 831 adds the downlink main signal output from the main signal processing unit 820 and a superimposition signal output from the control unit 850 and outputs the resulting signal to the optical transceiving unit 840. The superimposition separating unit 832 frequency-separates a signal output from the optical transceiving unit 840 and acquires an uplink main signal and a superimposition signal from the signal output from the optical transceiving unit 840. The superimposition separating unit 832 then outputs the acquired main signal to the main signal processing unit 820 and outputs the acquired superimposition signal to the control unit 850.

The optical transceiving unit 840 converts the signal output from the superimposing unit 831 into an optical signal. The optical transceiving unit 840 then outputs the converted optical signal to the AWG 212 depicted in FIG. 2, for transmission to the ONU 220. The optical transceiving unit 840 receives the optical signal sent from the ONU 220 and output from the AWG 212. The optical transceiving unit 840 then outputs the received signal to the superimposition separating unit 832.

The control unit 850 acquires from the superimposition signal output from the superimposition separating unit 832, a message from the ONU 220. The message from the ONU 220 includes, for example, the above wavelength utilization permission request message, the authentication request message, the confirmation message, etc. The control unit 850 outputs to the superimposing unit 831, the superimposition signal indicative of the message to the ONU 220. The message to the ONU 220 includes, for example, the above uplink/downlink wavelength information, etc. message, the wavelength utilization permission message, the authentication message, etc.

The control unit 850 can be implemented by a digital circuit such as a digital signal processor (DSP) or a field programmable gate array (FPGA).

The sending units 211$b$ (#1 to #4) and the receiving units 211$c$ (#1 to #4) depicted in FIG. 2 can be implemented by the optical transceiving unit 840, for example. The monitoring control units 211$a$ (#1 to #4) depicted in FIG. 2 can be implemented by the control unit 850 for example.

Figure 9:
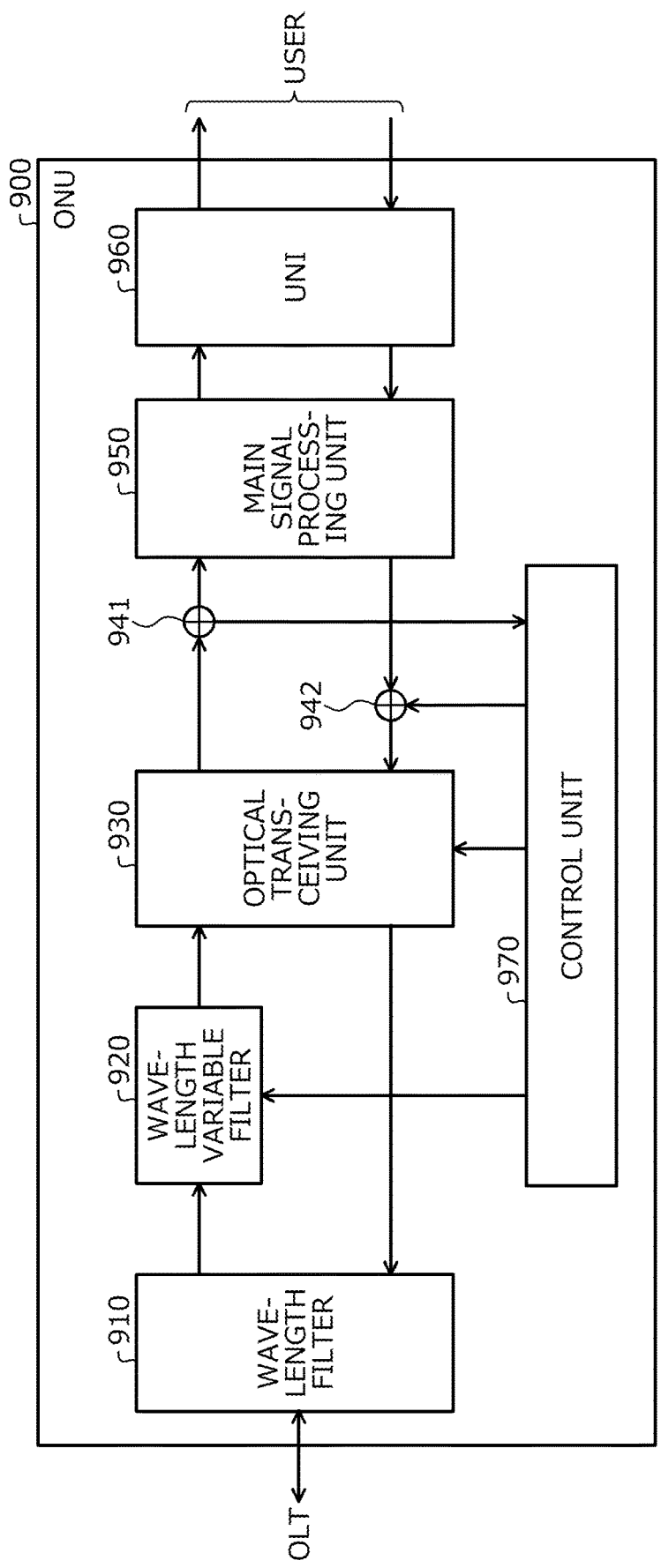
FIG. 9 is diagram depicting an example of ONUs according to the first embodiment.

FIG. 9 is diagram depicting an example of the ONU according to the first embodiment. Each of the ONUs 220 (#1 to #4) depicted in FIG. 2 can be implemented by an ONU 900 depicted in FIG. 9, for example. The ONU 900 includes a wavelength filter 910, a wavelength variable filter 920, an optical transceiving unit 930, a superimposition separating unit 941, a superimposing unit 942, a main signal processing unit 950, a UNI 960, and a control unit 970. UNI is an abbreviation for user network interface.

The wavelength filter 910 outputs to the wavelength variable filter 920, the downlink optical signal sent from the optical splitter 230. The wavelength filter 910 sends to the optical splitter 230, the uplink optical signal output from the optical transceiving unit 930. The wavelength filter 910 can be implemented by, for example, a filter that transmits light of an uplink wavelength band (e.g., wavelengths λ11 to λ14) and reflects light of a downlink wavelength band (e.g., wavelengths λ1 to λ4).

The wavelength variable filter 920 transmits only an optical signal of a reception band configured by the control unit 970, of optical signals output from the wavelength filter 910, allowing output to the optical transceiving unit 930.

The optical transceiving unit 930 receives an optical signal output from the wavelength variable filter 920. The optical transceiving unit 930 then outputs the received downlink signal to the superimposition separating unit 941. The optical transceiving unit 930 converts a signal output from the system information extracting unit 942, into an optical signal. The optical transceiving unit 930 then outputs the converted optical signal to the optical splitter 230 depicted in FIG. 2, for transmission to the OLT 210.

The superimposition separating unit 941 frequency-separates a signal output from the optical transceiving unit 930 and acquires a downlink main signal and a superimposition signal from the signal output from the optical transceiving unit 930. The superimposition separating unit 941 then outputs the acquired main signal to the main signal processing unit 950 and outputs the acquired superimposition signal to the control unit 970. The superimposing unit 942 adds the main signal output from the main signal processing unit 950 and the superimposition signal output from the control unit 970 and outputs the resulting signal to the optical transceiving unit 930.

The main signal processing unit 950 processes the downlink main signal output from the superimposition separating unit 941 and outputs the processed downlink main signal to the UNI 960. The main signal processing unit 950 processes the main signal included in the signal output from the UNI 960 and outputs the processed uplink main signal to the superimposing unit 942.

The UNI 960 is a user communication interface connected to the user equipment. For example, the UNI 960 sends to the user equipment, the downlink main signal output from the main signal processing unit 950. The UNI 960 receives the uplink main signal sent from the user equipment and outputs the received uplink main signal to the main signal processing unit 950.

The control unit 970 acquires a message from the OLT 210, from the superimposition signal output from the superimposition separating unit 941. The message from the OLT 210 includes, for example, the above uplink/downlink wavelength information, etc. message, the wavelength utilization permission message, the authentication message, etc. The control unit 970 outputs to the superimposing unit 942, the superimposition signal indicative of a message to the OLT 210. The message to the OLT 210 includes, for example, the above wavelength utilization permission request message, the authentication request message, the confirmation message, etc. The control unit 970 can be implemented by the digital circuit such as the DSP or the FPGA.

The monitoring control units 221 (#1 to #4) depicted in FIG. 2 can be implemented by the control unit 970, for example. The sending units 222 (#1 to #4) and receiving units 223 (#1 to #4) depicted in FIG. 2 can be implemented by the wavelength variable filter 920 and the optical transceiving unit 930, for example. The wavelength filters 224 (#1 to #4) depicted in FIG. 2 can be implemented by the wavelength filter 910, for example.

Figure 10:
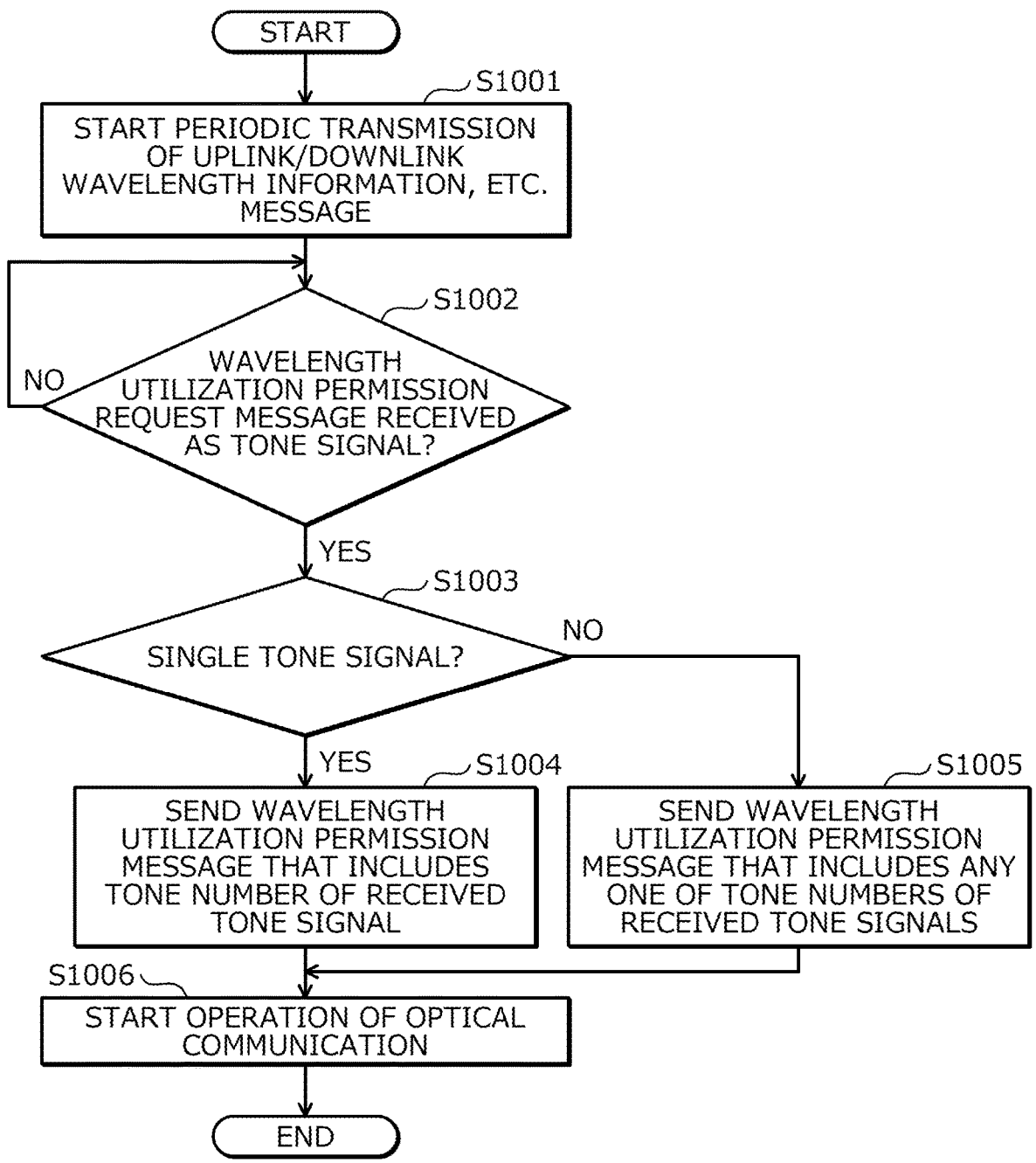
FIG. 10 is a flowchart depicting an example of processing by an OLT according to the first embodiment.

FIG. 10 is a flowchart depicting an example of processing by the OLT according to the first embodiment. The OLT 210 according to the first embodiment executes steps depicted in FIG. 10, for example, for each of inactive optical transceivers 211. A wavelength λx represents the downlink wavelength of the optical transceiver 211 to be processed, while a wavelength λ1x represents the uplink wavelength of the optical transceiver 211 to be processed. The steps depicted in FIG. 10 are executed under the control of the control unit 850 depicted in FIG. 8, for example.

First, the OLT 210 starts periodic transmission of the uplink/downlink wavelength information, etc. message indicating that the downlink wavelength λx is idle and that the uplink wavelength corresponding to the downlink wavelength λx is λ1x (step S1001). This uplink/downlink wavelength information, etc. message is sent in the form of an AMCC signal of the wavelength λx, for example.

Next, the OLT 210 determines whether a wavelength utilization permission request message has received as a tone signal of the wavelength λ1x from the ONU 220 connected thereto (step S1002) and waits until a wavelength utilization permission request message is received (step S1002: NO). The tone signal is any one of the tone 401 and the tone signals 403 to 405 depicted in FIG. 4 for example. This tone signal is, for example, a tone signal of a frequency that has one-to-one correspondence with identification information specific to the sender ONU 220. Accordingly, even though the tone signals of the wavelength utilization permission request messages are sent simultaneously from the plural ONUs 220, the OLT 210 can receive the respective tone signals by the frequency separation.

When receiving the wavelength utilization permission request message at step S1002 (step S1002: YES), the OLT 210 determines whether the received tone signal of the wavelength utilization permission request message is a single tone signal (step S1003). When the received tone signal is a single tone signal (step S1003: YES), the OLT 210 sends, at the frequency λx, a wavelength utilization permission message that includes the tone number of the tone signal (step S1004), and transitions to step S1006. The tone number of the tone signal is a number indicating the frequency of the tone signal, for example. In this case, the OLT 210 may stop the periodic transmission of the uplink/downlink wavelength information, etc. message regarding the optical transceiver 211 to be processed.

When the received tone signal is not a single tone signal at step 1003 (step S1003: NO), the OLT 210 transitions to step S1005. The OLT 210 sends, at the wavelength λx, a wavelength utilization permission message that includes any one of the tone numbers of the received tone signals (step S1005), and transitions to step S1006. For example, the priority of the tone numbers are previously configured in the OLT 210 so that the OLT 210 sends a wavelength utilization permission message that includes the tone number of a higher priority among the tone numbers of the received tone signals. Alternatively, the OLT 210 may send a wavelength utilization permission message that includes a tone number selected at random from among the tone numbers of received tone signals.

Next, the OLT 210 uses the wavelength λx as the downlink and the wavelength λ1x as the uplink wavelength and starts the operation of optical communication with a target ONU 220 (step S1006), and terminates a series of processes. The target ONU 220 is an ONU 220 that sent the tone signal of the tone number included in the wavelength utilization permission message sent at step S1004 or step S1005.

In the example depicted in FIG. 10, while the process of including the tone number to the wavelength utilization permission message has been described, such a process is not limitative hereto. For example, when the wavelength utilization permission request message includes the ONU number of the sender ONU 220, the OLT 210 may include the ONU number to the wavelength utilization permission message at step S1004. In this case, at step S1005, the OLT 210 may include the ONU number of the sender of the selected wavelength utilization permission request message, to the wavelength utilization permission message.

Figure 11:
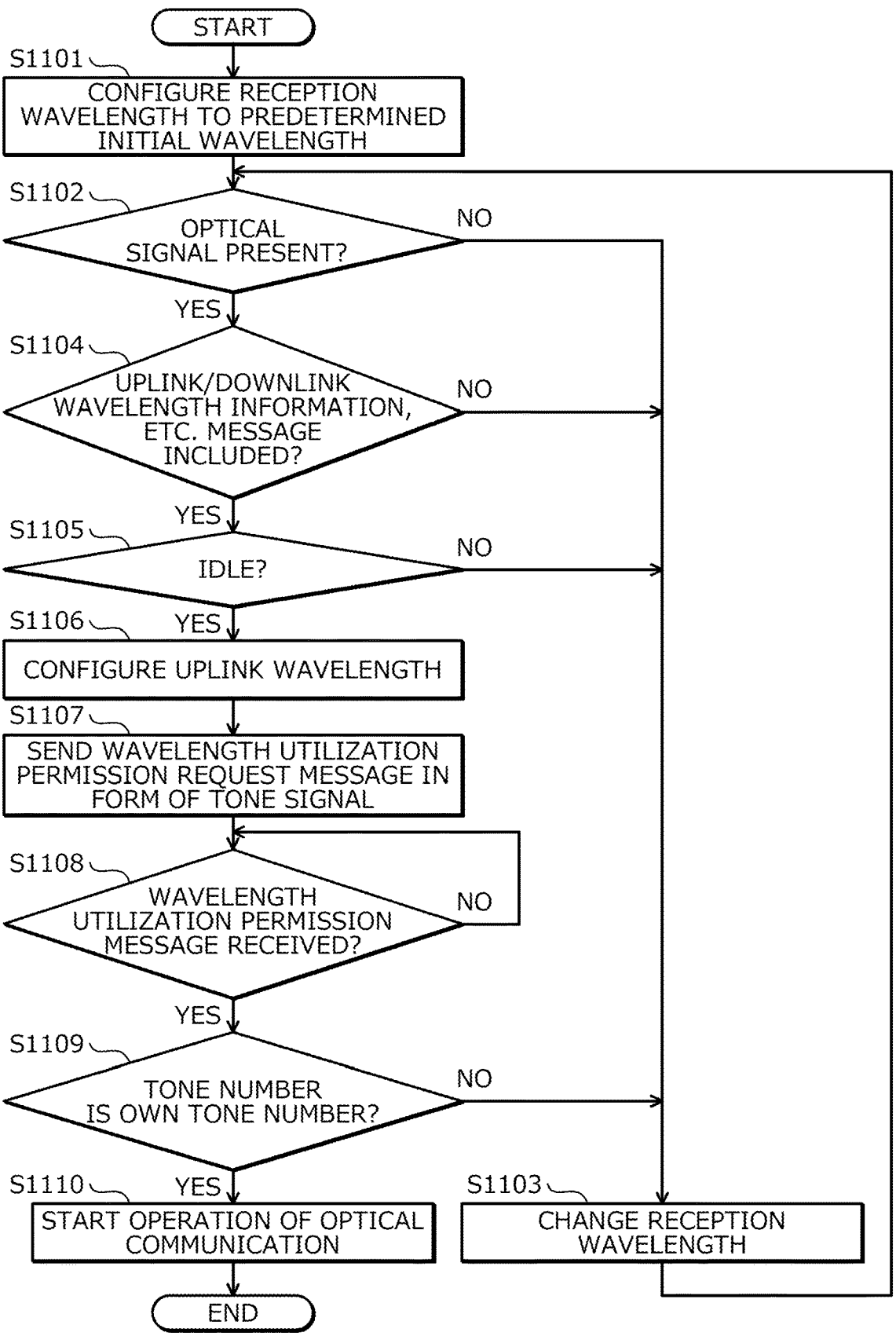
FIG. 11 is a flowchart depicting an example of processing by an ONU according to the first embodiment.

FIG. 11 is a flowchart depicting an example of processing by the ONU according to the first embodiment. In the case that the OLT 210 executes the processes at the steps depicted in FIG. 10, each of the ONUs 220 (#1 to #4) according to the first embodiment executes processes at steps depicted in FIG. 11, for example. The processes depicted in FIG. 11 are executed under the control of the control unit 970 depicted in FIG. 9, for example.

First, the ONU 220 configures the reception wavelength thereof to a predetermined initial wavelength (step S1101). The reception wavelength of the ONU 220 is the wavelength of light received by the ONU 220 among the wavelengths of light sent from the OLT 210 and reaching the ONU 220. The reception wavelength can be configured by regulating the transmission wavelength of the wavelength filter 910 depicted in FIG. 9, for example. As an example, at step S1101, the ONU 220 configures the reception wavelength thereof to a shortest wavelength among wavelengths at which the OLT 210 can send an optical signal.

Next, the ONU 220 determines whether an optical signal at the reception wavelength configured at step S1101 is present in light sent from the OLT 210 (step S1102). When no optical signal is present (step S1102: NO), the ONU 220 changes the reception wavelength thereof (step S1103) and returns to step S1102. As an example, at step S1103, the ONU 220 shifts the reception wavelength toward a longer wavelength by a predetermined unit amount.

When an optical signal is present at step S1102 (step S1102: YES), the ONU 220 determines whether uplink/downlink wavelength information, etc. message is included as a superimposition signal in the optical signal (step S1104). When no uplink/downlink wavelength information, etc. message is included (step S1104: NO), the ONU 220 transitions to step S1103.

When uplink/downlink wavelength information, etc. message is included at step S1104 (step S1104: YES), the ONU 220 transitions to step S1105. The ONU 220 determines whether the current reception wavelength is idle at the OLT 210, based on the uplink/downlink wavelength information, etc. message (step S1105). In a case that the uplink/downlink wavelength information, etc. message of a certain wavelength is sent from the OLT 210 only when the certain wavelength is idle, the ONU 220 may omit step 1105 and transition to step S1106.

When the current reception wavelength is not idle at step S1105 (step S1105: NO), the ONU 220 transitions to step S1103. When the current reception wavelength is idle (step S1105: YES), the ONU 220 configures the uplink wavelength thereof to an uplink wavelength indicated by the uplink/downlink wavelength information, etc. message (step S1106). Configuration of the uplink wavelength can be performed by controlling the output wavelength of the LD of the optical transceiving unit 930, by the control unit 970 depicted in FIG. 9, for example.

Next, the ONU 220 sends the wavelength utilization permission request message in the form of a tone signal of the uplink wavelength that is configured at step S1106 (step S1107). The ONU 220 configures the frequency (tone frequency) of the tone signal of the wavelength utilization permission request message sent at step S1107, to a frequency that has one-to-one correspondence with identification information specific to the ONU 220.

Next, the ONU 220 determines whether the wavelength utilization permission message from the OLT 210 has been received at the current reception wavelength (step S1108) and waits until the wavelength utilization permission message is received (step S1108: NO). When receiving the wavelength utilization permission message (step S1108: YES), the ONU 220 determines whether the tone number included in the received wavelength utilization permission message is the tone number of the ONU 220 (step S1109). The tone number of the ONU 220 is a number indicative of the frequency of the tone signal of the wavelength utilization permission request message sent at step S1107, i.e., a number indicative of the frequency that has one-to-one correspondence with identification information specific to the ONU 220.

At step S1109, when the tone signal included in the wavelength utilization permission message is not the tone number of the ONU 220 (step S1109: NO), the ONU 220 transitions to step S1103. Alternatively, in this case, the ONU 220 may proceed to step S1101.

At step S1109, when the tone number included in the wavelength utilization permission message is the tone number of the ONU 220 (step S1109: YES), the ONU 220 starts the operation of optical communication with the OLT 210 (step S1110) and terminates a series of processes. For example, the ONU 220 uses the current reception wavelength (downlink wavelength) and the uplink wavelength set at step S1106, and starts the operation of optical communication with the OLT 210.

In the example depicted in FIG. 11, while a sweep has been described where the reception wavelength is shifted from the shortest wavelength toward a longer wavelength by a unit amount, the sweep of the reception wavelength is not limited hereto. For example, the ONU 220 may sweep the reception wavelength by shifting the reception wavelength from the longest wavelength toward a shorter wavelength by a unit amount. Alternatively, the ONU 220 may sweep the reception wavelength by repeating processing of the reception wavelength in the form of a wavelength selected randomly from among unselected wavelengths.

In the example depicted in FIG. 11, while the processing has been described where the ONU 220 determines whether the tone number of the ONU 220 is included in the wavelength utilization permission message at step S1109 and thereby, judges whether the ONU 220 has been permitted to use the wavelength by, such processing is not limitative. For example, in a case where the ONU number of an ONU 220 that has been granted permission to use the wavelength is included in the wavelength utilization permission message, the ONU 220 may judge whether the ONU 220 has been permitted to use the wavelength by determining whether the ONU number of the ONU 220 is included in the wavelength utilization permission message.

Figure 12:
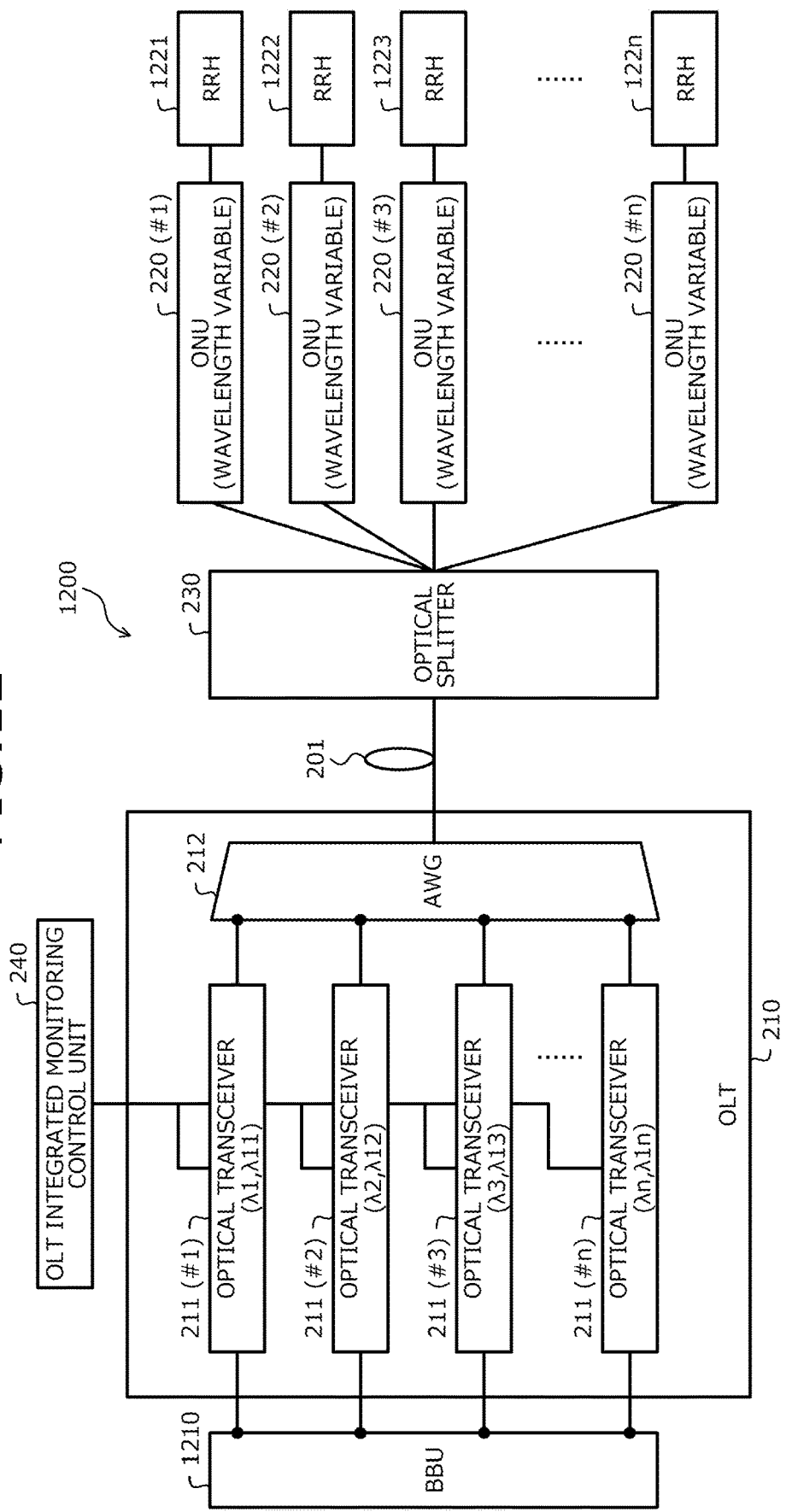
FIG. 12 is a diagram depicting an example of a base station apparatus to which the PON system according to the first embodiment is applied.

FIG. 12 is a diagram depicting an example of a base station apparatus to which the PON system according to the first embodiment is applied. In FIG. 12, parts similar to those depicted in FIG. 2 are designated by the same reference numerals and will not again be described. The PON system 200 depicted in FIG. 2 is applicable to a base station apparatus 1200 depicted in FIG. 12, for example. The base station apparatus 1200 includes a BBU 1210, the OLT 210, the optical transmission path 201, the optical splitter 230, the ONUs 220 (#1 to #n), and RRHs 1221 to 122n. Herein, n is a natural number equal to or greater than 2. BBU is an abbreviation for baseband unit. RRH is an abbreviation for remote radio head.

The BBU 1210 performs baseband processing in the base station apparatus 1200. For example, the BBU 1210 performs baseband processing of a downlink signal from a higher-level apparatus of the base station apparatus 1200 in a mobile communication network and sends the baseband-processed downlink signal to the OLT 210. The BBU 1210 performs baseband processing of an uplink signal sent from the OLT 210 and sends the baseband-processed downlink signal to the higher-level apparatus of the base station apparatus 1200 in the mobile communication network.

In the example depicted in FIG. 12, the OLT 210 includes n optical transceivers 211 (#1 to #n). The optical transceivers 211 (#1 to #n) transmit to the ONUs 220 (#1 to #n), respectively, downlink signals sent from the BBU 1210, in the form of optical signals of wavelengths $\lambda 1$ to $\lambda n$. The optical transceivers 211 (#1 to #n) receive uplink signals transmitted as optical signals of wavelengths $\lambda 11$ to $\lambda 1n$ from the ONUs 220 (#1 to #n), respectively, and transmit the received uplink signals to the BBU 1210.

The ONUs 220 (#1 to #n) receive downlink signals transmitted as optical signals from the optical transceivers 211 (#1 to #n), respectively, and transmit the received downlink signals to the RRHs 1221 to 122n, respectively. The ONUs 220 (#1 to #n) receive uplink signals sent from the RRHs 1221 to 122n, respectively, and transmit the received uplink signals as optical signals to the optical transceivers 211 (#1 to #n), respectively.

The RRHs 1221 to 122n receive downlink signals sent from the ONUs 220 (#1 to #n), respectively, and wirelessly transmit the received downlink signals to mobile terminals, respectively. The RRHs 1221 to 122n receive uplink signals wirelessly sent from the mobile terminals and transmit the received uplink signals to the ONUs 220 (#1 to #n), respectively.

In this manner, according to the first embodiment, the ONU 220 can transmit to the OLT 210, a wavelength utilization permission request message (utilization permission request) for a detected idle wavelength, as a tone signal of a frequency corresponding to the ONU number of the ONU 220. As a result, even though wavelength utilization permission request messages to the OLT 210 are transmitted at the same timing and at the same wavelength from the ONUs 220, the OLT 210 can receive the respective wavelength utilization permission request messages. For this reason, the OLT permits one of the ONUs 220 to use a wavelength so that the wavelength can be configured by that ONU 220.

While a configuration has been described where the frequency of a tone signal of a wavelength utilization permission request message sent from the ONU 220 is the frequency corresponding to the ONU number of that ONU 220, such a configuration is not limitative. For example, the ONU 220 may randomly select and configure the frequency of the tone signal of the wavelength utilization permission request message. In this case as well, even though wavelength utilization permission request messages to the OLT 210 are transmitted at the same timing and at the same wavelength from the ONUs 220, there is a higher possibility that the OLT 210 can receive the respective wavelength utilization permission request messages. Hence, the OLT 210 permits one of the ONUs 220 to use a wavelength so that the wavelength can be configured by that ONU 220.

For example, mobile traffic has been rapidly increasing as of late, resulting in increased traffic in access areas such as a mobile backhaul network joining a mobile base station and an optical line terminal and leading to investigation of applications of DWDM technology to access areas. The PON configuration is applied to access areas and, to deal with future traffic increases, the WDM PON-equivalent configuration has been studied in G.metro of ITU-T or in NG-PON2 PtP WDM. ITU-T is an abbreviation for international telecommunication union-telecommunication sector. WDM is an abbreviation for wavelength division multiplexing. DWDM is an abbreviation for dense wavelength division multiplexing.

In the configuration discussed in NG-PON2 PtP WDM, to implement a simple and low-cost configuration, use of a wavelength variable light source as the transmission light source that is used in the user apparatus called the ONU has been studied for the purpose of commonalizing (reducing the variety of) the ONU. The wavelength of the wavelength variable light source of each ONU is configured by superimposing a monitoring signal onto the main signal by the center apparatus called the OLT.

In such a configuration, when plural ONUs start activation at the same time, the plural ONUs may simultaneously receive respective uplink/downlink wavelength information, etc. messages sent from the OLT and send respective wavelength utilization permission request messages at the same time. In this case, due to the simultaneous reception of the wavelength utilization permission request messages from the plural ONUs, the OLT cannot correctly discriminate the wavelength utilization permission request messages.

As an example where plural ONUs start activation at the same time, there is the operation of mobile front haul accommodating traffics of small cell base stations, for example. In such mobile front haul, depending on the mobile user distribution status, the small cell base stations in the area having a less number of users may be inactivated, whereas if the number of the users rapidly increases due to, for example, events, peripheral small cell base stations may be activated all at once. In such a case, the plural ONUs start activation at the same time.

On the contrary, according to the first embodiment described above, the wavelength utilization permission request message from each ONU is sent as a tone signal of a frequency assigned to each ONU or as a tone signal of a random frequency. Hence, even if plural ONUs start activation at the same time and send the respective wavelength utilization permission request messages at the same time, the OLT can receive and discriminate the wavelength utilization permission request messages at the same time.

Since the OLT sends a wavelength utilization permission message in response to one wavelength utilization permission request message, ONUs without acquisition of the wavelength utilization permission message may again start the activation, to thereby enable different wavelengths to be assigned to the ONUs in sequence.

Regarding a second embodiment, portions thereof different from the first embodiment will be described. In the second embodiment, when detecting a first wavelength not used for the sending of the main signal by the first optical transmission apparatus 10, the second optical transmission apparatus 110 monitors light received by the receiving unit 112, while varying the transmission wavelength of the wavelength variable filter 111 from a random wavelength. In this case, the utilization permission request sent from the second optical transmission apparatus 110 may be any signal instead of the tone signal. The second optical transmission apparatus 110 may send the utilization permission request after the elapse of a random time from the detection of the first wavelength.

Figure 13:
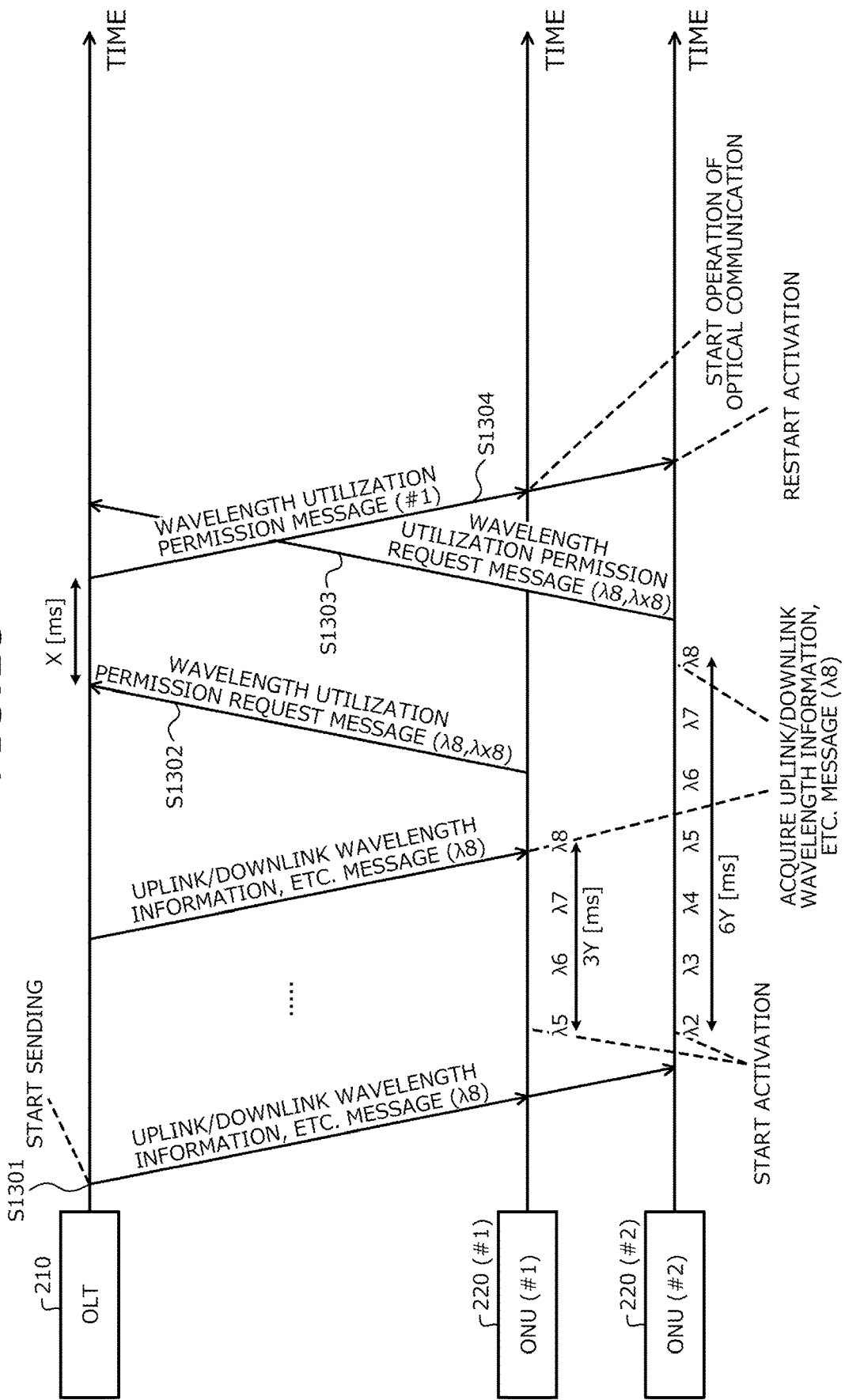
FIG. 13 is a sequence diagram depicting an example of processing in the PON system according to a second embodiment.

FIG. 13 is a sequence diagram depicting an example of processing in the PON system according to the second embodiment. In the PON system 200 according to the second embodiment, processes at steps depicted in FIG. 13 are executed. In the example depicted in FIG. 13, the ONUs 220 (#1 and #2) perform activation with respect to the OLT 210. In the example depicted in FIG. 13, the OLT 210 can use wavelengths $\lambda 1$ to $\lambda 16$ as the downlink wavelength, with the wavelengths $\lambda 1$ to $\lambda 7$ and $\lambda 10$ to $\lambda 16$ thereamong being in use and the wavelengths $\lambda 8$ and $\lambda 9$ being idle. Here, the uplink wavelengths corresponding to the downlink wavelengths $\lambda 1$ to $\lambda 16$ are assumed to be wavelengths $\lambda x1$ to $\lambda x16$, respectively.

First, the OLT 210 starts periodic transmission of the uplink/downlink wavelength information, etc. message to the ONU 220 connected thereto, for each of the idle wavelengths $\lambda 8$ and $\lambda 9$ (step S1301). In FIG. 13, the uplink/downlink wavelength information, etc. message for the wavelength $\lambda 8$ is depicted.

Next, the ONUs 220 (#1 and #2) are assumed to start activation at the same time and to start the sweep of the reception wavelength for light sent from the OLT 210. At this time, each of the ONUs 220 (#1 and #2) configures the sweep start wavelength thereof randomly. In the example depicted in FIG. 13, the ONU 220 (#1) starts the sweep from the wavelength $\lambda 5$, while the ONU 220 (#2) starts the sweep from the wavelength $\lambda 2$. Here, Y [ms] is assumed to be the time unit by which the ONUs 220 (#1 and #2) vary the reception wavelength in the sweep of the reception wavelength.

In this case, the ONU 220 (#1) varies the reception wavelength in order of wavelength λ5, wavelength λ6, wavelength λ7, and wavelength λ8 every Y [ms]. Therefore, the ONU 220 (#1) has the reception wavelength of 8λ in 3Y [ms] after the start of the sweep, to acquire the uplink/downlink wavelength information, etc. message from the OLT 210 for the wavelength λ8.

On the other hand, the ONU 220 (#2) varies the reception wavelength in order of wavelength λ2, wavelength λ3, wavelength λ4, wavelength λ5, etc. every Y [ms]. Therefore, the ONU 220 (#2) has the reception wavelength of 8λ at 6Y [ms] after the start of the sweep, and acquires an uplink/downlink wavelength information, etc. message from the OLT 210 for the wavelength λ8.

When acquiring the uplink/downlink wavelength information, etc. message for the wavelength λ8, the ONU 220 (#1) sends a wavelength utilization permission request message requesting utilization permission for the wavelengths λ8 and λx8, in the form of an optical signal of the wavelength λx8, to the OLT 210 (step S1302). This wavelength utilization permission request message includes the serial number of the ONU 220 (#1), for example.

When acquiring the uplink/downlink wavelength information, etc. message for the wavelength λ8, the ONU 220 (#2) sends a wavelength utilization permission request message requesting utilization permission for the wavelengths λ8 and λx8, in the form of an optical signal of the wavelength λx8, to the OLT 210 (step S1303). This wavelength utilization permission request message includes the serial number of the ONU 220 (#2), for example. The transmission of the wavelength utilization permission request message from the ONU 220 (#2) at step S1303 is in 3Y [ms] after the transmission of the wavelength utilization permission request message from the ONU 220 (#1) at step S1302.

Next, the OLT 210 sends the wavelength utilization permission message permitting the use of the wavelengths λ8 and λx8, at the wavelength λ8, to the ONU 220 (#1) that is the sender of the wavelength utilization permission request message received at step S1302 (step S1304). This wavelength utilization permission message includes the serial number of the ONU 220 (#1), for example.

Here, X [ms] is assumed to be the time (e.g., time taken for processing such as detection of the threshold value of the superimposition signal) required for the OLT 210 to receive the wavelength utilization permission request message at step S1302. Since the OLT 210 has sent the wavelength utilization permission message permitting the use of the wavelengths λ8 and λx8 to the ONU 220 (#1), the OLT 210 does not send the wavelength utilization permission message in response to the wavelength utilization permission request message received at step S1303.

As a result of receiving from the OLT 210, a wavelength utilization permission message that includes the serial number of the ONU 220 (#1), the ONU 220 (#1) determines that the ONU 220 (#1) has been permitted to use the wavelengths λ8 and λx8. Thus, the ONU 220 (#1) completes the activation and starts an operation of optical communication with the OLT 210, using the wavelengths λ8 and λx8.

On the other hand, as a result of not receiving from the OLT 210, a wavelength utilization permission message that includes the serial number of the ONU 220 (#2), the ONU 220 (#2) determines that the ONU 220 (#2) has not been permitted to use the wavelengths λ8 and λx8. Thus, the ONU 220 (#2) again starts the activation.

The OLT 210 stops the periodic transmission of the uplink/downlink wavelength information, etc. message for the wavelength λ8 whose use has started. On the other hand, the OLT 210 continues the periodic transmission of the uplink/downlink wavelength information, etc. message for the idle wavelength λ9. When again starting the activation, the ONU 220 (#2) resumes the sweep of the reception wavelength of light sent from the OLT 210. At this time, the ONU 220 (#2) resumes the sweep from the wavelength λ9 next to the wavelength λ8 that is the last reception wavelength, for example. As a result of this, the ONU 220 (#2) acquires the uplink/downlink wavelength information, etc. message from the OLT 210 for the wavelength λ9, for example, and after the completion of the activation, starts an operation of optical communication with the OLT 210 using the wavelengths λ9 and λx9.

The sweep resumption method is not limited to the above. For example, the ONU 220 (#2) may resume the sweep from the initial wavelength λ2 or may resume the sweep from a wavelength selected randomly.

Alternatively, the time unit Y [ms] by which the ONUs 220 (#1 and #2) vary the reception wavelength may be configured to be equal to or greater than the time X [mx] required for the OLT 210 to receive the wavelength utilization permission request message. As a consequence, when the sweep starting wavelength of the reception wavelength differs between the ONUs 220 (#1 and #2), the transmission timings of the wavelength utilization permission request message also differ by time X or more. Thus, an occurrence of an instance in which a wavelength utilization permission request message from one ONU 220 reaches the OLT 210 while the OLT 210 is receiving a wavelength utilization permission request message from another ONU 220 can be suppressed. Therefore, an occurrence of an instance in which the OLT 210 cannot receive any wavelength utilization permission request message can be suppressed. For example, if the time X is approx. 70 [ms], the time unit Y [ms] can be set to 100 [ms].

Figure 14:
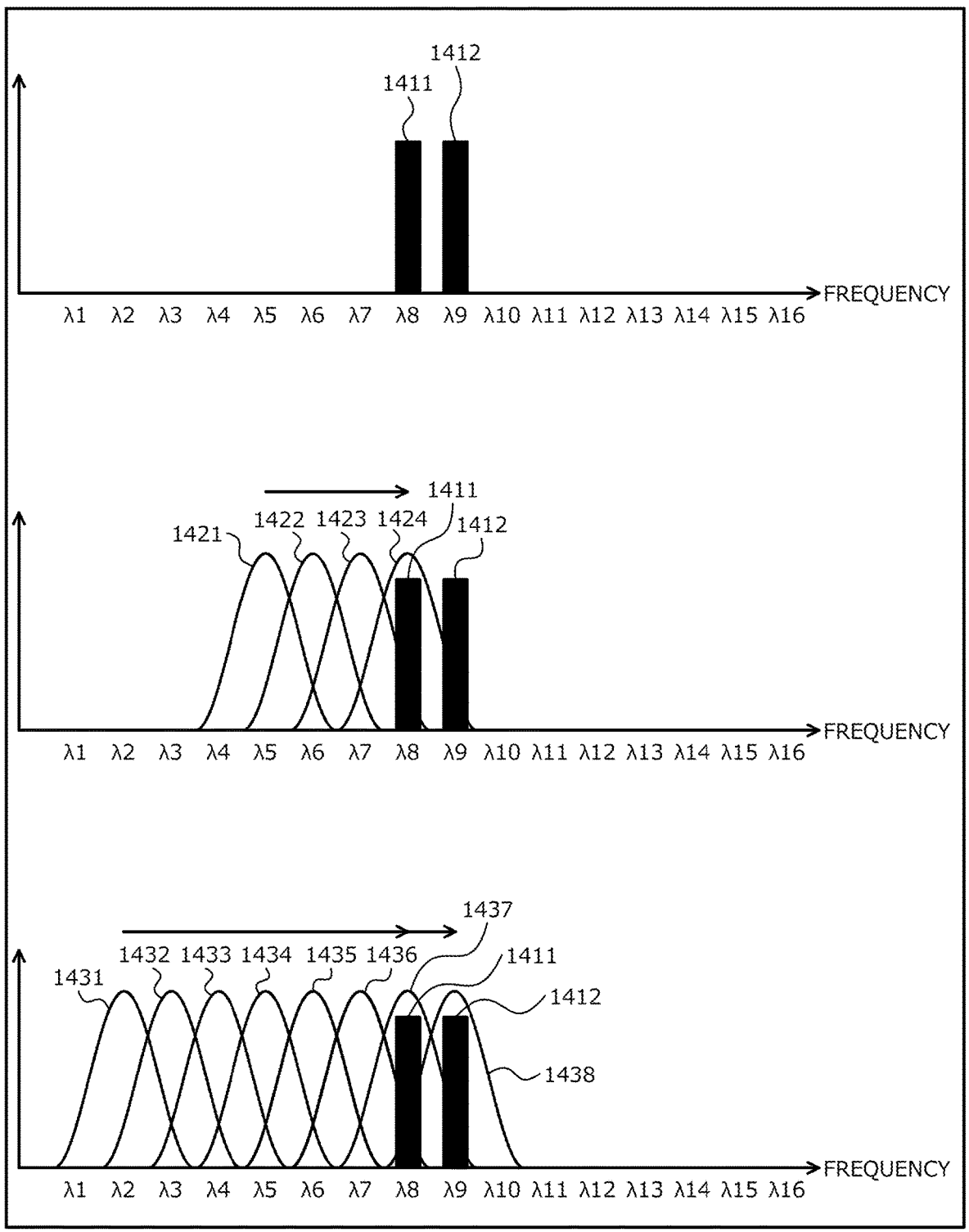
FIG. 14 is a diagram depicting an example of a sweep of ONU reception wavelength according to the second embodiment.

FIG. 14 is a diagram depicting an example of the sweep of ONU reception wavelength according to the second embodiment. In FIG. 14, a horizontal axis represents frequency. Similar to the example depicted in FIG. 13, the OLT 210 can use the wavelengths λ1 to λ16 as the downlink wavelength, with the wavelengths λ1 to λ7 and λ10 to λ16 thereamong being in use and the wavelengths λ8 and λ9 being idle.

Uplink/downlink wavelength information, etc. messages 1411 and 1412 are uplink/downlink wavelength information, etc. messages for the idle wavelengths λ8 and λ9, respectively. The OLT 210 sends the uplink/downlink wavelength information, etc. messages 1411 and 1412 at the wavelengths λ8 and λ9, respectively.

Transmission spectra 1421 to 1424 show variations in the reception wavelength of the ONU 220 (#1). For example, the transmission spectrum 1421 is a transmission spectrum whose center wavelength is the wavelength λ5. Accordingly, by configuring the transmission spectrum of the wavelength variable filter 920 (see FIG. 9) to the transmission spectrum 1421, the ONU 220 (#1) can configure the reception wavelength of the ONU 220 (#1) to the wavelength λ5.

The ONU 220 (#1) can allow the reception wavelength of the ONU 220 (#1) to be swept at the wavelengths λ5 to λ8 by configuring the transmission spectrum of the wavelength variable filter 920 thereof to transmission spectra 1421 to 1424 in sequence. The ONU 220 (#1) can then acquire the uplink/downlink wavelength information, etc. message 1411 for the wavelength λ8 at the point of time when the transmission spectrum of the wavelength variable filter 920 thereof has been configured to the transmission spectrum 1424 (the reception wavelength of the wavelength λ8).

Transmission spectra 1431 to 1438 show variations in the reception wavelength of the ONU 220 (#2). For example, the transmission spectrum 1431 is a transmission spectrum whose center wavelength is the wavelength λ2. Thus, by configuring the transmission spectrum of the wavelength variable filter 920 (see FIG. 9) to the transmission spectrum 1431, the ONU 220 (#2) can set the reception frequency of the ONU 220 (#2) to the wavelength λ2.

The ONU 220 (#2) can allow the reception wavelength of the ONU 220 (#2) to be swept at the wavelengths λ2 to λ8 by configuring the transmission spectrum of the wavelength variable filter 920 thereof to transmission spectra 1431 to 1437 in sequence. The ONU 220 (#2) can then acquire the uplink/downlink wavelength information, etc. message 1411 for the wavelength λ8 at the point of time when the transmission spectrum of the wavelength variable filter 920 thereof has been configured to the transmission spectrum 1437 (the reception wavelength of the wavelength λ8).

In the example depicted in FIG. 13, the ONU 220 (#2) fails in the activation based on the uplink/downlink wavelength information, etc. message 1411 and therefore, again sweeps the reception wavelength. The ONU 220 (#2) can then acquire the uplink/downlink wavelength information, etc. message 1412 for the wavelength λ9 at the point of time when the transmission spectrum of the wavelength variable filter 920 thereof has been configured to the transmission spectrum 1438 (the reception wavelength of the wavelength λ9).

Figure 15:
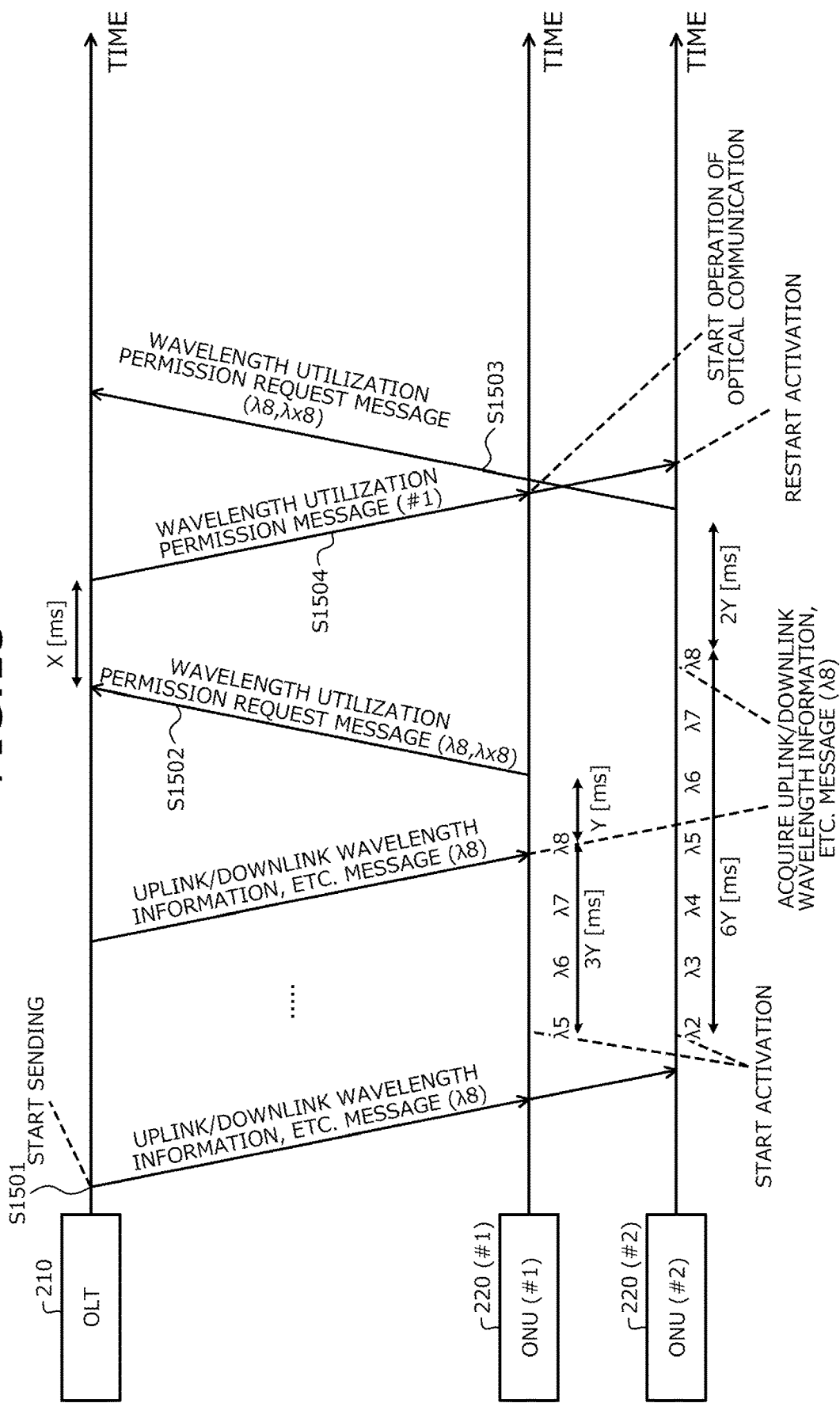
FIG. 15 is a sequence diagram depicting another example of processing in the PON system according to the second embodiment.

FIG. 15 is a sequence diagram depicting another example of processing in the PON system according to the second embodiment. In the PON system 200 according to the second embodiment, processes at steps depicted in FIG. 15, for example, may be executed. In the example depicted in FIG. 15, similar to the example depicted in FIG. 13, the OLT 210 can use the wavelengths λ1 to λ16 as the downlink wavelength, with the wavelengths λ1 to λ7 and λ10 to λ16 thereamong being in use and the wavelengths λ8 and λ9 being idle.

Processes at steps S1501 to S1504 depicted in FIG. 15 are similar to the processes at the steps S1301 to S1304 depicted in FIG. 13. It is to be noted that at step S1502, the ONU 220 (#1) sends the wavelength utilization permission request message requesting utilization permission for the wavelengths λ8 and λx8, after the elapse of a time period of a random length from the acquisition of the uplink/downlink wavelength information, etc. message for the wavelength λ8. In the example depicted in FIG. 15, this time period of a random length is Y [ms].

At step S1503, the ONU 220 (#2) sends the wavelength utilization permission request message requesting utilization permission for the wavelengths λ8 and λx8, after the elapse of a random time period from the acquisition of the uplink/downlink wavelength information, etc. message for the wavelength λ8. In the example depicted in FIG. 15, this time period of a random length is 2Y [ms].

Hence, in the example depicted in FIG. 15, sending of the wavelength utilization permission request message from the ONU 220 (#2) at step S1503 is 4Y [ms] from the sending of the wavelength utilization permission request message from the ONU 220 (#1) at step S1502.

As in the example depicted in FIG. 15, not only the sweep starting wavelength of the reception wavelength in the ONUs 220 (#1 and #2) but also the length of the time period from the reception of the uplink/downlink wavelength information, etc. message up to the sending of the wavelength utilization permission request message may be random. As a result, an occurrence of an instance in which the wavelength utilization permission request messages of the same wavelength are sent from the ONUs 220 (#1 and #2) at the same timing can be further suppressed.

The unit of length of the time period from the reception of the uplink/downlink wavelength information, etc. message up to the sending of the wavelength utilization permission request message may be set to be Y [ms] (Y≥X). More specifically, the ONUs 220 (#1 and #2) may each generate a random natural number of 1 or more, for example, and set the time period of a length obtained by multiplying the generated natural number by Y, as the time period from the reception of the uplink/downlink wavelength information, etc. message in the ONUs 220 (#1 and #2) up to the sending of the wavelength utilization permission request message therefrom. Thus, an occurrence of an instance in which a wavelength utilization permission request message from one ONU 220 reaches the OLT 210 while the OLT 210 is receiving a wavelength utilization permission request message from another ONU 220 can be suppressed. Therefore, an occurrence of an instance in which the OLT 210 cannot receive any wavelength utilization permission request message can be suppressed.

In this manner, according to the second embodiment, when detecting an idle wavelength not used by the OLT 210, the ONU 220 monitors an optical signal received from the OLT 210 while sweeping the transmission wavelength of the wavelength variable filter 920 from a random wavelength. Thus, an occurrence of an instance in which plural ONUs 220 simultaneously detect the same idle wavelength not used by the OLT 210 and wavelength utilization permission request messages of the same wavelength are sent at the same timing from the plural ONUs 220 can be suppressed. Accordingly, there is an increased possibility that the OLT 210 can receive the wavelength utilization permission request messages and as a result, the OLT 210 permits one of the ONUs 220 to use a wavelength so that the wavelength can be configured by the permitted ONU 220.

Alternatively, the ONU 220 may transmit the wavelength utilization permission request message to the OLT 210 after the elapse of a random time period after the detection of an idle wavelength not used by the OLT 210. As a result, an occurrence of an instance in which wavelength utilization permission request messages of the same wavelength are sent at the same timing from the plural ONUs 220 can be suppressed.

Regarding a third embodiment, portions thereof different from the first and second embodiments will be described. In the third embodiment, a configuration will be described where the uplink/downlink wavelength information, etc. message includes part of a serial number of the ONU 220 permitted to send a wavelength utilization permission request message.

FIG. 16 is sequence diagram depicting an example of processing in the PON system according to the third embodiment. In the PON system 200 according to the third embodiment, processes at steps depicted in FIG. 16 for example are executed. In the example depicted in FIG. 16, a case will be described where the ONUs 220 (#1 and #2) perform activation with respect to the OLT 210.

Processes at steps S1601 to S1603 depicted in FIG. 16 are similar to the processes at the steps S301 to S303 depicted in FIG. 3, for example. Note that the OLT 210 allows the uplink/downlink wavelength information, etc. message to include information indicative of the last digit of the serial number (e.g., four digits) of the ONU 220 permitted to send a wavelength utilization permission request message. In the example depicted in FIG. 16, the last digit of the serial number of the ONU 220 (#1) coincides with information included in the uplink/downlink wavelength information, etc. message. The last digit of the serial number of the ONU 220 (#2) does not coincide with information included in the uplink/downlink wavelength information, etc. message.

In this case, the ONU 220 (#1) sends the wavelength utilization permission request message to the OLT 210 since the information included in the uplink/downlink wavelength information, etc. message acquired from the OLT 210 coincides with the last digit of the serial number of the ONU 220 (#1). On the other hand, the ONU 220 (#2) resumes the activation without sending a wavelength utilization permission request message to the OLT 210 since the information included in the uplink/downlink wavelength information, etc. message acquired from the OLT 210 does not coincide with the last digit of the serial number of the ONU 220 (#2).

In this manner, according to the third embodiment, the OLT 210 sends an uplink/downlink wavelength information, etc. message that includes information indicative of the last digit of the serial number of the ONU 220 that is permitted to send a wavelength utilization permission request message by the OLT 210. As a result, an occurrence of an instance in which wavelength utilization permission request messages of the same wavelength are sent at the same timing from plural ONUs 220 can be suppressed. Accordingly, there is an increased possibility that the OLT 210 can receive the respective wavelength utilization permission request messages and permit one of the ONUs 220 to use a wavelength so that the wavelength can be configured by that ONU 220.

The OLT 21 may allow the last digit of the serial number included in the uplink/downlink wavelength information, etc. message to differ depending on the wavelength (optical transceiver 211). As a result, the ONU 220 (#2) whose last digit of the serial number does not coincide detects an uplink/downlink wavelength information, etc. message of another wavelength, thereby enabling the ONU 220 (#2) to send a wavelength utilization permission request message.

The OLT 210 may randomly select the last digit of the serial number included in the uplink/downlink wavelength information, etc. message. The OLT 210 may periodically change the last digit of the serial number included in the uplink/downlink wavelength information, etc. message. While a configuration has been described where the last digit of the serial number is included in the uplink/downlink wavelength information, etc. message, information included in the uplink/downlink wavelength information, etc. message can be any part of the serial number without being limited to the last digit of the serial number. For example, information included in the uplink/downlink wavelength information, etc. message may be the first digit or the last two digits of the serial number. Information included in the uplink/downlink wavelength information, etc. message is not limited to the serial number but may be the ONU number or part thereof.

As set forth hereinabove, according to the optical transmission apparatus, the optical transmission system, and the optical transmission method, wavelength configuration is feasible even when plural optical transmission apparatuses send respective wavelength utilization permission requests at the same wavelength.

According to the embodiments described above, accompanying ONU apparatus activation, wavelength assignment of a transmission light source can be carried out efficiently.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An optical transmission system comprising:
a first optical transmission apparatus that performs optical transmission; and
a second optical transmission apparatus and a third optical transmission apparatus each of which includes
a wavelength variable filter whose transmission light wavelength is variable;
a receiver that receives light, the light being sent from the first optical transmission apparatus and passing through the wavelength variable filter;
a detector that monitors the light received by the receiver while changing a transmission wavelength of the wavelength variable filter and detects a first wavelength of the light not used by the first optical transmission apparatus to send a first main signal;
a transmitter that when the first wavelength is detected by the detector, sends a utilization permission request of a second wavelength corresponding to the first wavelength upon completion of a random time period from detection of the first wavelength by the detector, the transmitter sending the utilization permission request to the first optical transmission apparatus, as light of the second wavelength; and
a controller that when receiving from the first optical transmission apparatus, a utilization permission notification of the second wavelength to a sender of the utilization permission request, sets a wavelength of a second main signal to the second wavelength, the second main signal being sent from the transmitter to the first optical transmission apparatus, wherein
the detector of the second optical transmission apparatus changes the transmission wavelength of the wavelength variable filter from a first start wavelength that is randomly configured by the second optical transmission apparatus, and
the detector of the third optical transmission apparatus changes the transmission wavelength of the wavelength variable filter from a second start wavelength that is different from the first start wavelength and randomly configured by the third optical transmission apparatus.

2. The optical transmission system according to claim 1, wherein
the transmitter of the second optical transmission apparatus sends the utilization permission request when a portion of a serial number of the second optical transmission apparatus coincides with a number received from the first optical transmission apparatus, and
the transmitter of the third optical transmission apparatus sends the utilization permission request when a portion of a serial number of the third optical transmission apparatus coincides with the number received from the first optical transmission apparatus.

3. An optical transmission system comprising:

a first optical transmission apparatus that performs optical transmission; and a second optical transmission apparatus and a third optical transmission apparatus each of which includes
- a wavelength variable filter whose transmission light wavelength is variable;
- a receiver that receives light, the light being sent from the first optical transmission apparatus and passing through the wavelength variable filter;
- a detector that monitors the light received by the receiver while changing a transmission wavelength of the wavelength variable filter and detects a first wavelength of the light not used by the first optical transmission apparatus to send a first main signal;
- a transmitter that when the first wavelength is detected by the detector, sends a utilization permission request of a second wavelength corresponding to the first wavelength, the transmitter sending the utilization permission request to the first optical transmission apparatus, as light of the second wavelength; and
- a controller that when receiving from the first optical transmission apparatus, a utilization permission notification of the second wavelength to a sender of the utilization permission request, sets a wavelength of a second main signal to the second wavelength, the second main signal being sent from the transmitter to the first optical transmission apparatus, wherein the transmitter of the second optical transmission apparatus sends the utilization permission request when the first wavelength is detected and a portion of a serial number of the second optical transmission apparatus coincides with a number received from the first optical transmission apparatus, and the transmitter of the third optical transmission apparatus sends the utilization permission request when the first wavelength is detected and a portion of a serial number of the third optical transmission apparatus coincides with the number received from the first optical transmission apparatus.

4. The optical transmission system according to claim 3, wherein the transmitter of the second optical transmission apparatus sends the utilization permission request after elapse of a first random time period from detection of the first wavelength, and the transmitter of the third optical transmission apparatus sends the utilization permission request after elapse of a second random time period from detection of the first wavelength, the second random time period differing from the first random time period.

5. The optical transmission system according to claim 3, wherein the detector of the second optical transmission apparatus changes the transmission wavelength from a first start wavelength that is randomly configured by the second optical transmission apparatus, and the detector of the third optical transmission apparatus changes the transmission wavelength from a second start wavelength that is different from the first start wavelength and randomly configured by the third optical transmission apparatus.

* * * * *